United States Patent
Xiang et al.

(10) Patent No.: US 12,450,023 B2
(45) Date of Patent: Oct. 21, 2025

(54) SCREEN PROJECTION EXCEPTION PROCESSING METHOD AND ELECTRONIC DEVICE

(71) Applicant: HONOR DEVICE CO., LTD., Shenzhen (CN)

(72) Inventors: Chao Xiang, Shenzhen (CN); Shikun Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/020,245

(22) PCT Filed: Aug. 29, 2022

(86) PCT No.: PCT/CN2022/115530
§ 371 (c)(1),
(2) Date: Feb. 7, 2023

(87) PCT Pub. No.: WO2023/045712
PCT Pub. Date: Mar. 30, 2023

(65) Prior Publication Data
US 2025/0028498 A1    Jan. 23, 2025

(30) Foreign Application Priority Data
Sep. 26, 2021  (CN) .......................... 202111130333.2
Oct. 15, 2021  (CN) .......................... 202111205897.8

(51) Int. Cl.
G06F 3/14       (2006.01)
G06F 3/147      (2006.01)

(52) U.S. Cl.
CPC ............ G06F 3/1454 (2013.01); G06F 3/147 (2013.01)

(58) Field of Classification Search
CPC .............................. G06F 3/1454; G06F 3/147
See application file for complete search history.

(56) References Cited

U.S. PATENT DOCUMENTS

2011/0199389 A1*  8/2011  Lu ..................... G06F 3/0484
                                                 345/619
2013/0335431 A1* 12/2013  Beeler ................... G06F 3/14
                                                 345/520
(Continued)

FOREIGN PATENT DOCUMENTS

CN       108595137 A      9/2018
CN       110515572 A     11/2019
(Continued)

OTHER PUBLICATIONS

Anonymous;"Comments on youtube video"how to exit the second screen only mode"" Mar. 15, 2021;Retrieved from the internet,URL:https://www.youtube.com/watch?v=Rxu79kQ69d8.
(Continued)

*Primary Examiner* — Dmitriy Bolotin
(74) *Attorney, Agent, or Firm* — WOMBLE BOND DICKINSON (US) LLP

(57) ABSTRACT

This application provides a screen projection processing method and an electronic device, and relates to the field of communication technologies. By using the solution of this application, when a screen projection source device performs screen projection to a screen projection target device through a screen projection application, if the screen projection application is closed abnormally, a state of a virtual display driver is set to a disabled state. In this way, the virtual display driver will no longer create a virtual display, so that the screen projection source device cannot capture an image used for screen projection in a case that no virtual display exists. Therefore, in a non-screen projection scenario after the screen projection application is restarted, a display screen of the screen projection source device performs display normally without a black screen phenomenon.

16 Claims, 18 Drawing Sheets

(56) References Cited

U.S. PATENT DOCUMENTS

2019/0278549 A1    9/2019   Monden
2020/0065312 A1    2/2020   Camiel
2022/0342850 A1    10/2022  Cao et al.

FOREIGN PATENT DOCUMENTS

| CN | 111432070 A | 7/2020 |
| CN | 111634188 A | 9/2020 |
| CN | 111857925 A | 10/2020 |
| CN | 112394891 A | 2/2021 |
| CN | 112527222 A | 3/2021 |
| CN | 112732089 A | 4/2021 |
| CN | 112740168 A | 4/2021 |
| CN | 112905289 A | 6/2021 |
| CN | 112988102 A | 6/2021 |
| CN | 113014972 A | 6/2021 |
| CN | 113157230 A | 7/2021 |
| CN | 114063951 A | 2/2022 |
| WO | 2021164631 A1 | 8/2021 |

OTHER PUBLICATIONS

Do_It_Yourself;"How to Exit the Second Screen Only Mode";Apr. 19, 2020;Retrieved from the internet, URL:https://www.youtube.com/watch?v=Rxu79kQ69d8.

Chen Wuting;"Discussion on the treatment method of digital film screening equipment Failure";Advanced Motion Picture Technology;May 11, 2017.

\* cited by examiner

SCREEN PROJECTION EXCEPTION PROCESSING METHOD AND ELECTRONIC DEVICE

CROSS-REFERENCE TO RELATED APPLICATIONS

This application is a national stage of International Application No. PCT/CN2022/115530, filed on Aug. 29, 2022, which claims priority to Chinese Patent Application No. 202111130333.2, filed on Sep. 26, 2021, and Chinese Patent Application No. 202111205897.8, filed on Oct. 15, 2021. The disclosures of each of the aforementioned applications are hereby incorporated by reference in their entireties.

TECHNICAL FIELD

This application relates to the field of communication technologies, and in particular, to a screen projection exception processing method and an electronic device.

BACKGROUND

With the development of terminal technologies and communication technologies, screen projection applications between electronic devices are becoming increasingly popular. After a screen projection connection is established between an electronic device (which is referred to as a screen projection source device) and another electronic device (which is referred to as a screen projection target device), the screen projection source device performs wireless screen projection to the screen projection target device.

During screen projection, if the screen projection source device is shut down abnormally (for example, triggered by an irregular shutdown operation of a user, or triggered by a power failure of the device), a screen projection service between the screen projection source device and the screen projection target device will be invalid.

However, after the screen projection source device is restarted, if the user presses a Windows+P key of the screen projection source device, the screen projection source device can be triggered to display a plurality of screen projection options, such as an "Only the local screen for display" option, a "Copy" option, an "Extend" option, and an "Only the second screen for display" option. If the user selects the "Only the second screen for display" option, a display screen of the screen projection source device will appear black in a non-screen projection scenario, and the foregoing problem cannot be resolved by restarting the screen projection source device. Generally, in a non-screen projection scenario, when the user selects the "Only the second screen for display" option in the local screen projection function, the local display screen will not appear black.

SUMMARY

This application provides a screen projection exception processing method and an electronic device, which resolves a problem of a black screen phenomenon in a non-screen projection scenario after a screen projection source device is restarted due to abnormal shutdown of the screen projection source device during screen projection.

To achieve the foregoing objective, the following technical solutions are used in this application:

According to a first aspect, this application provides a screen projection exception processing method, including: performing, by a screen projection source device, screen projection to a screen projection target device through a screen projection application; re-enabling, by the screen projection source device, the screen projection application in a case that the screen projection application is closed abnormally; detecting, by the screen projection source device, that a virtual display driver is in an enabled state; setting, by the screen projection source device, a state of the virtual display driver to a disabled state.

The screen projection application is an application installed in the screen projection source device and configured to trigger screen projection between devices; and the virtual display driver is a drive program in the screen projection source device that is configured to implement a screen projection function.

By using the solution of this application, when the screen projection source device performs screen projection to the screen projection target device through the screen projection application, if the screen projection application is closed abnormally, the state of the virtual display driver is set to the disabled state after the screen projection application is re-enabled. In this way, the virtual display driver will no longer create a virtual display, so that the screen projection source device cannot capture an image used for screen projection in a case that no virtual display exists. Therefore, in a non-screen projection scenario after the screen projection application is restarted, when a user selects an "Only the second screen for display" option in the local screen projection function of the screen projection source device, a display screen of the screen projection source device performs display normally without a black screen phenomenon.

In a possible implementation, the method may further include: detecting, by the screen projection source device, that there is a display parameter in a registration table in the screen projection source device; and deleting, by the screen projection source device, the display parameter in the registration table. The registration table is a storage area for storing a display parameter of the screen projection target device.

In a possible implementation, the method may further include: disconnecting, by the screen projection source device, a screen projection connection with the screen projection target device in a case that the screen projection application is closed abnormally.

In a possible implementation, after the setting, by the screen projection source device, a state of the virtual display driver to a disabled state, the method may further include: prohibiting, by the screen projection source device in a case that the virtual display driver is in the disabled state, the virtual display driver from creating a virtual display, an image displayed by the virtual display being used for being displayed by the screen projection target device during screen projection.

In a possible implementation, after the setting, by the screen projection source device, a state of the virtual display driver to a disabled state, and/or after the deleting, by the screen projection source device, the display parameter in the registration table, the method may further include: receiving, by the screen projection source device, a first input by a user, the first input being only used for triggering screen display of the screen projection target device; and skipping, by the screen projection source device, responding to the first input.

In a possible implementation, the re-enabling, by the screen projection source device, the screen projection application in a case that the screen projection application is closed abnormally specifically includes: automatically enabling, by the screen projection source device, the screen projection application in a case that the screen projection application is closed abnormally; or re-enabling, by the screen projection source device, the screen projection application in response to a user triggering operation in a case that the screen projection application is closed abnormally.

In a possible implementation, the re-enabling, by the screen projection source device, the screen projection application in a case that the screen projection application is closed abnormally specifically includes: the screen projection application being closed abnormally in a case that the screen projection source device is shut down abnormally; and restarting and enabling, by the screen projection source device, the screen projection application in response to a second input by the user.

In a possible implementation, the method is applied to the screen projection source device, where the screen projection application, a Windows interface corresponding to the screen projection application, and the virtual display driver are installed on the screen projection source device, and the screen projection source device is provided with the registration table; and the performing, by a screen projection source device, screen projection to a screen projection target device through a screen projection application includes:
establishing, by the screen projection source device, a screen projection connection with the screen projection target device through the screen projection application;
acquiring, by the screen projection source device, the display parameter of the screen projection target device through the screen projection connection;
writing, by the screen projection source device, the display parameter of the screen projection target device into the registration table of a preset path through the screen projection application;
invoking, by the screen projection source device, the Windows interface through the screen projection application to set the virtual display driver to the enabled state, the Windows interface being an application programming interface corresponding to the screen projection application and installed on the screen projection source device;
reading, by the screen projection source device, the display parameter of the screen projection target device from the registration table through the virtual display driver;
creating, by the screen projection source device, the virtual display according to the display parameter of the screen projection target device through the virtual display driver;
feeding, by the virtual display driver, successful creation of the virtual display back to the screen projection application through the Windows interface;
acquiring, by the screen projection source device through the screen projection application, an image displayed by the virtual display as a screen projection image, the image displayed by the virtual display being an image displayed in the screen projection source device; and
sending, by the screen projection source device, the screen projection image to the screen projection target device through the screen projection application.

In a possible implementation, the detecting, by the screen projection source device, that a virtual display driver is in an enabled state includes: invoking, by the screen projection source device, the Windows interface through the screen projection application to detect that the virtual display driver is in the enabled state; and the setting, by the screen projection source device, a state of the virtual display driver to a disabled state includes: invoking, by the screen projection source device, the Windows interface through the screen projection application to set the state of the virtual display driver to the disabled state.

In a possible implementation, the detecting, by the screen projection source device, that there is a display parameter in a registration table in the screen projection source device includes: invoking, by the screen projection source device, the Windows interface through the screen projection application to detect that there is the display parameter in the registration table in the screen projection source device; and the deleting, by the screen projection source device, the display parameter in the registration table includes: invoking, by the screen projection source device, the Windows interface through the screen projection application to delete the display parameter in the registration table.

In a possible implementation, the establishing, by the screen projection source device, a screen projection connection with the screen projection target device through the screen projection application includes:
receiving, by the screen projection source device, a third input by the user on an application icon of the screen projection application, the third input being used for triggering the screen projection source device to establish the screen projection connection with the screen projection target device;
in response to the third input, finding, by the screen projection source device, the screen projection target device, and displaying an identifier of the screen projection target device;
receiving, by the screen projection source device, a fourth input by the user, the fourth input being used for selecting the identifier of the screen projection target device; and
establishing, by the screen projection source device, the screen projection connection with the screen projection target device in response to the fourth input.

In a possible implementation, the display parameter of the screen projection target device includes at least one of the following: a display size, resolution, or a refresh rate of a display screen.

According to a second aspect, this application provides a screen projection exception processing apparatus, including units configured to perform the method according to the first aspect. The apparatus may correspondingly perform the method described in the first aspect. For relevant description of the units in the apparatus, reference may be made to the description of the first aspect. For brevity, details are not described herein again.

The method described in the first aspect may be implemented by hardware or may be implemented by hardware executing corresponding software. The hardware or the software includes one or more modules or units corresponding to the foregoing functions, for example, a processing module or unit and a display module or unit.

According to a third aspect, this application provides an electronic device. The electronic device includes a processor, the processor being coupled to a memory, the memory being configured to store a computer program or instructions, and the processor being configured to execute the computer program or instructions stored in the memory, to cause the method according to the first aspect to be performed.

For example, the processor is configured to execute the computer program or instructions stored in the memory, to cause the apparatus to perform the method according to the first aspect.

According to a fourth aspect, this application provides a computer-readable storage medium, storing a computer program (which may also be referred to as instructions or code) for implementing the method according to the first aspect.

For example, the computer program, when executed by a computer, enables the computer to perform the method according to the first aspect.

According to a fifth aspect, this application provides a chip, including a processor. The processor is configured to read and execute a computer program stored in a memory, to perform the method according to the first aspect and any possible implementation of the first aspect.

Optionally, the chip further includes a memory, the memory being connected to the processor through a circuit or a wire.

According to a sixth aspect, this application provides a chip system, including a processor. The processor is configured to read and execute a computer program stored in a memory, to perform the method according to the first aspect and any possible implementation of the first aspect.

Optionally, the chip system further includes a memory, the memory being connected to the processor through a circuit or a wire.

According to a seventh aspect, this application provides a computer program product. The computer program product includes a computer program (which may also be referred to as instructions or code), the computer program, when executed by a computer, causing the computer to implement the method according to the first aspect.

It may be understood that, for beneficial effects of the second aspect to the seventh aspect, reference may be made to the relevant description in the first aspect, and details are not described herein again.

DESCRIPTION OF EMBODIMENTS

To make the objectives, technical solutions, and advantages of the embodiments of this application clearer, the technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The term "and/or" used herein describes only an association relationship for describing associated objects and represents that three relationships may exist. For example, A and/or B may represent the following three cases: Only A exists, both A and B exist, and only B exists. The symbol "/" herein represents an "or" relationship between associated objects. For example, "A/B" means A or B.

In the specification and claims herein, the terms "first", "second", and the like are intended to distinguish between different objects but do not indicate a particular order of the objects. For example, a first input, a second input, and the like are used for distinguishing between different inputs rather than describing a particular order of the inputs.

In the embodiments of this application, the word "exemplary" or "for example" is used to represent giving an example, an illustration, or a description. Any embodiment or design scheme described as "exemplary" or "for example" in the embodiments of this application should not be explained as being more preferable or having more advantages than other embodiments or design schemes. Exactly, the terms such as "exemplary" or "for example" are intended to present related concepts in a specific manner.

In the description of the embodiments of this application, unless otherwise stated, "a plurality of" means two or more. For example, "a plurality of processing units" means two or more processing units; and "a plurality of components" means two or more components.

Figure 1:
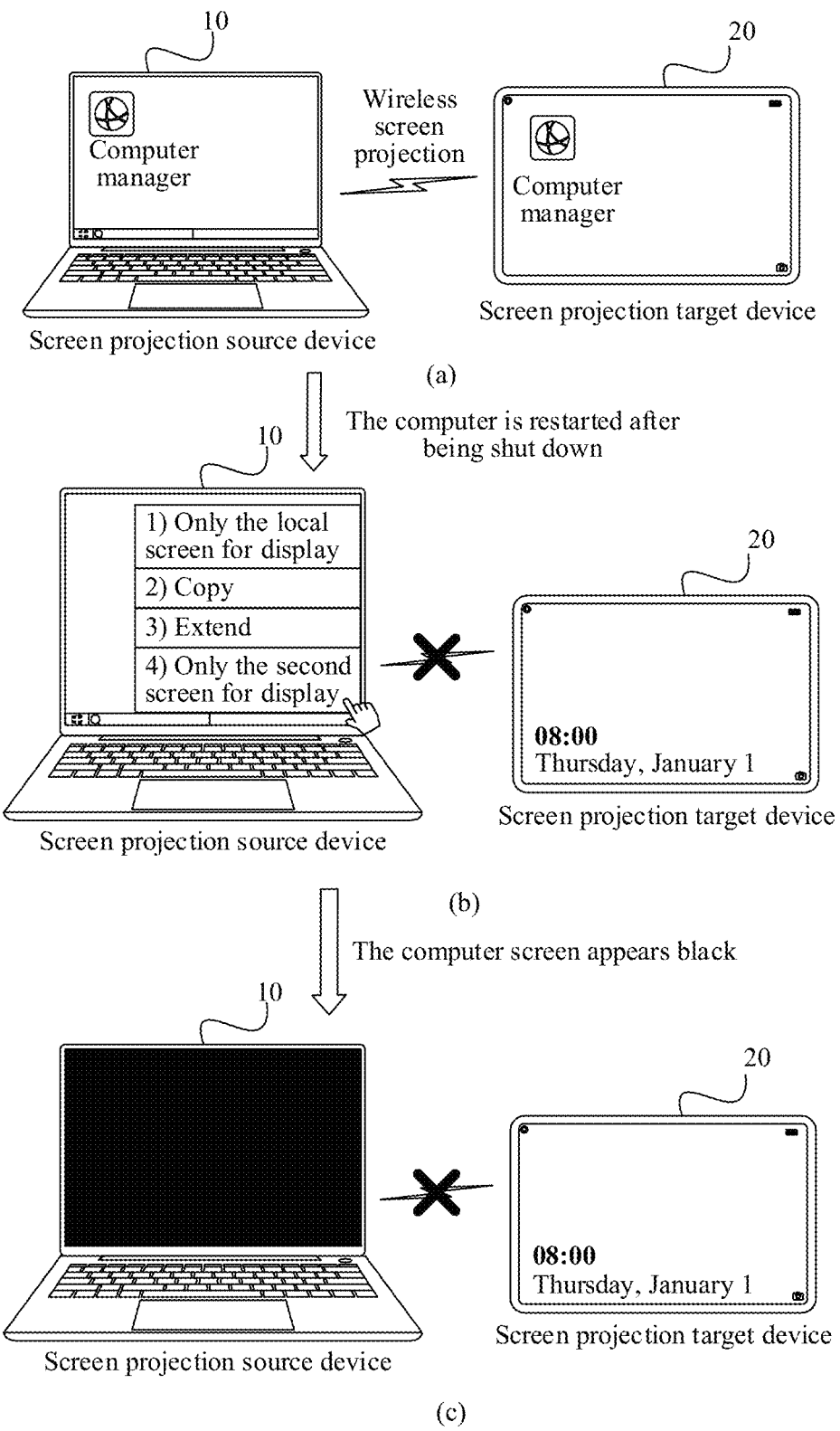
FIG. 1 is a schematic diagram of an application scenario of a screen projection exception processing method according to an embodiment of this application.

FIG. 1 is a schematic diagram of a system architecture involved in exemplary embodiments of this application. As shown in FIG. 1, the system architecture includes a screen projection source device 10 and a screen projection target device 20. A wireless connection may be established and maintained between the screen projection source device 10 and the screen projection target device 20 through a wireless communication technology. When the screen projection source device 10 and the screen projection target device 20 are in the same local area network, the screen projection source device 10 may initiate screen projection to the screen projection target device 20.

For example, it is assumed that the screen projection source device 10 and the screen projection target device 20 are both powered on and are in the same local area network (for example, a Wi-Fi network), and after the screen projection source device 10 enables a screen projection function, the screen projection source device 10 may search for all devices that support screen projection. After the screen projection source device 10 discovers the screen projection target device 20, the screen projection source device 10 may negotiate with the screen projection target device 20 for screen projection based on a screen projection protocol. After the negotiation is completed, the screen projection source device 10 may project screen display content of the screen projection source device 10 onto a screen of the screen projection target device 20 for display.

The foregoing screen projection source device 10 may be an electronic device with a display screen such as a notebook computer, a tablet computer, or a personal computer (personal computer, PC), and the screen projection target device 20 may be an electronic device with a display screen such as a smart TV or a tablet computer. The device types of the electronic devices in the communication system are not specifically limited in this embodiment of this application.

For example, a computer manager application (application, APP) may be installed in the screen projection source device 10, and the computer manager APP may include a computer screen projection function option, and the screen projection source device 10 may extend a Windows system desktop through the computer manager APP on the screen projection target device 20 such as a tablet computer or a large-screen device for display.

As shown in (a) of FIG. 1, the screen projection source device 10 establishes a wireless screen projection connection with the screen projection target device 20, and the screen projection source device 10 performs wireless screen projection to the screen projection target device 20.

When the screen projection source device 10 is shut down abnormally (for example, triggered by an irregular shutdown operation of a user, or triggered by a power failure of the device), the computer manager APP will be closed abnormally. The wireless screen projection connection between the screen projection source device 10 and the screen projection target device 20 is disconnected due to the abnormal shutdown of the computer. In this case, the screen projection source device 10 no longer performs screen projection to the screen projection target device 20. For ease of description, a scenario in which no wireless screen projection connection is established between a plurality of devices may be referred to as a non-screen projection scenario.

As shown in (b) of FIG. 1, after the screen projection source device 10 is restarted, if the user presses a Windows+P key of the screen projection source device 10, the screen projection source device 10 may be triggered to display a plurality of screen projection options, such as an "Only the local screen for display" option, a "Copy" option, an "Extend" option, and an "Only the second screen for display" option. If the user selects the "Only the second screen for display" option, as shown in (c) of FIG. 1, a display screen of the screen projection source device 10 will appear black in a non-screen projection scenario, and the foregoing problem cannot be resolved by restarting the device. Generally, in a non-screen projection scenario, when the user selects the "Only the second screen for display" option in the local screen projection function, the local display screen will not appear black.

According to the solution of this application, it is considered that the foregoing problem is caused by that: in some non-screen projection scenarios or scenarios in which the wireless screen projection connection is abnormally disconnected, because a virtual display driver for wireless screen projection is still in an enabled state, the virtual display driver in the enabled state will create a virtual display for screen projection, and the existence of the virtual display will cause a local black screen problem that appears when the user selects the "Only the second screen for display" option in the local screen projection function.

In view of this, this application provides a screen projection exception processing method, to add an exception determining mechanism: in a case that the computer manager APP is re-enabled after being closed abnormally, checking whether the virtual display driver is in the enabled state, and if the virtual display driver is in the enabled state, disabling the virtual display driver; and/or checking whether there is a display parameter in a registration table, and if there is a display parameter in the registration table, clearing the display parameter in the registration table. In this way, the virtual display driver will not create a virtual display for screen projection display in the disabled state. In this case, when the user selects the "Only the second screen for display" option in the local screen projection function, the local display screen will not appear black.

An execution entity of the screen projection exception processing method provided in the embodiments of this application may be an electronic device (for example, a screen projection source device), or may be functional modules and/or functional entities in the electronic device that are capable of implementing the screen projection exception processing method. In addition, the solutions of this application can be implemented in a hardware and/or software manner. Details may be determined according to an actual use requirement, and this is not limited in the embodiments of this application. The screen projection exception processing method provided in the embodiments of this application is exemplarily described below with reference to the accompanying drawings by using a screen projection source device as an example.

Figure 2:
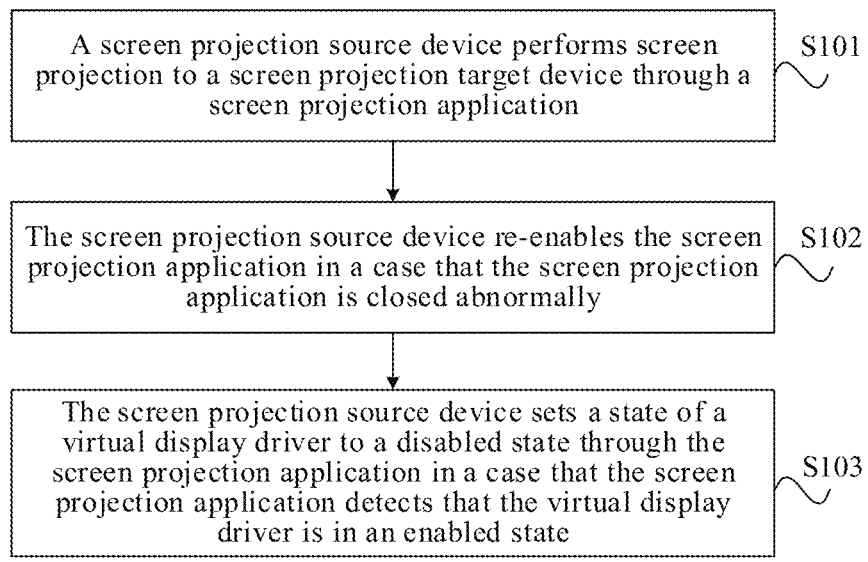
FIG. 2 is a schematic flowchart of a screen projection exception processing method according to an embodiment of this application.

FIG. 2 is a schematic flowchart of a screen projection exception processing method according to an embodiment of this application. As shown in FIG. 2, the method includes the following steps S101 to S103:

S101: A screen projection source device performs screen projection to a screen projection target device through a screen projection application.

Figure 3A:
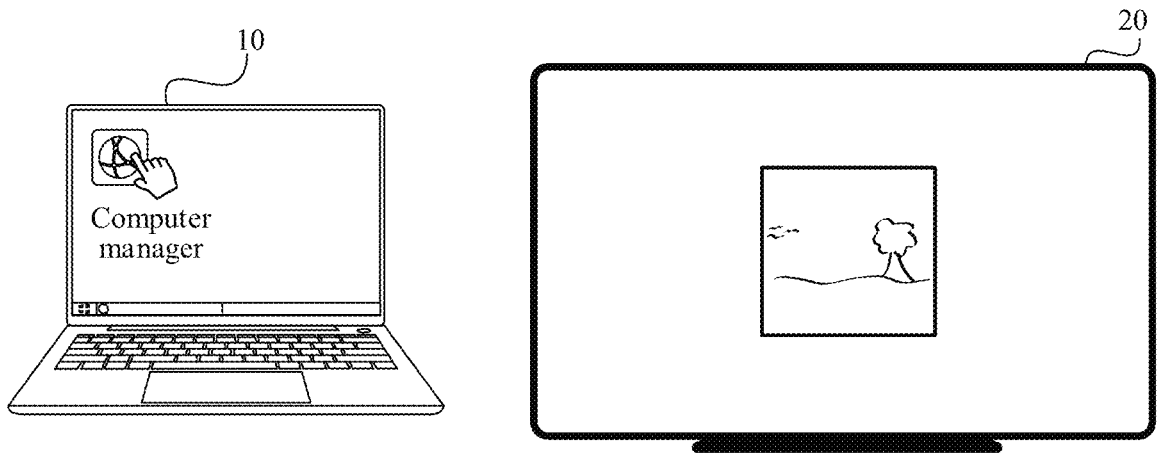
FIG. 3A to FIG. 3E are respectively schematic diagrams of a screen projection scenario in a screen projection exception processing method according to an embodiment of this application.
Figure 3B:
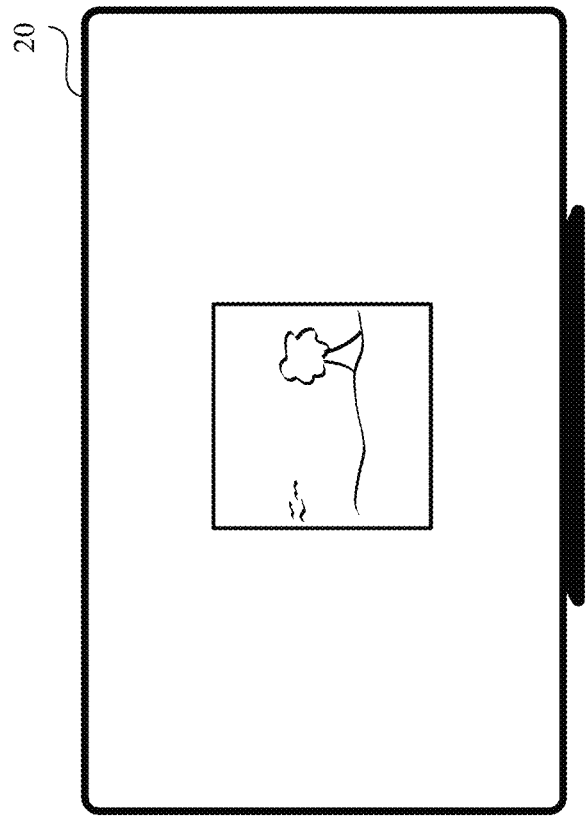
Figure 3B:
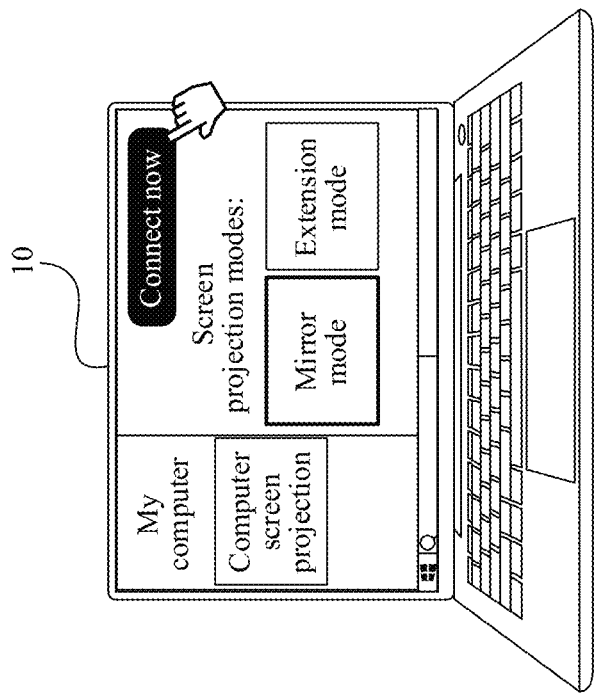

The screen projection application is an application installed in the screen projection source device and configured to trigger screen projection between devices. For example, as shown in FIG. 3A, a computer manager APP is installed on the screen projection source device 10, and the computer manager APP can support a screen projection function. As shown in FIG. 3B, computer screen projection options are displayed on a user interface (user interface, UI) of the computer manager APP, and a user may select a computer screen projection option from the UI of the computer manager APP to trigger the computer manager APP to invoke the screen projection application.

The following first describes the process of triggering screen projection of the screen projection source device to the screen projection target device through an operation of the user on the screen projection application of the screen projection source device. FIG. 3A to FIG. 3E are respectively schematic diagrams of man-machine interaction interfaces on which a user triggers screen projection through a computer manager APP. An exemplary description is provided below with reference to FIG. 3A to FIG. 3E by using an example in which the screen projection source device is a notebook computer and the screen projection target device is a smart TV.

As shown in FIG. 3A, the notebook computer 10 receives an input by the user on the computer manager APP. For example, the user clicks an icon of the computer manager APP. As shown in FIG. 3B, in response to the user's operation on the computer manager APP, the notebook computer 10 displays the UI of the computer manager APP, where the UI of the computer manager APP includes a user operation window corresponding to computer screen projection.

Screen projection mode options are displayed in the user operation window corresponding to the computer screen projection. The screen projection mode options include a mirror mode option and an extension mode option. In the mirror mode, computer screen content may be mirrored and displayed on a connected device, and in the extension mode, the computer screen content may be extended and displayed on the connected device.

Figure 3C:
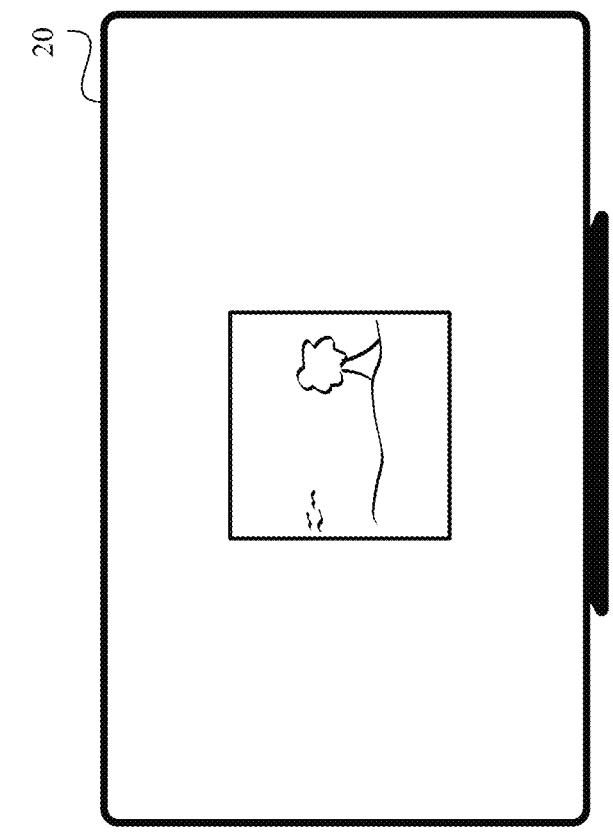
Figure 3C:
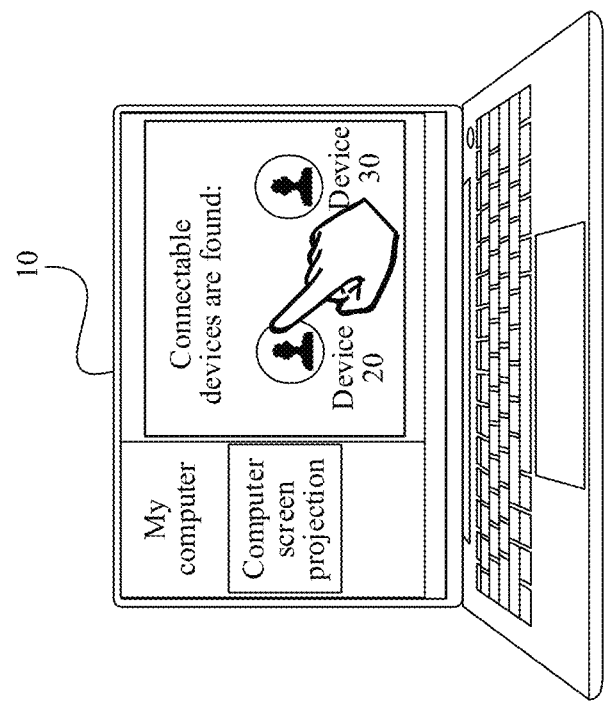

A control for triggering establishment of a wireless screen projection connection, for example, a "Connect now" control, is further displayed in the user operation window. The "Connect now" control is configured to trigger the notebook computer to establish a screen projection connection with the smartTV. As shown in FIG. 3C, in response to an input (for example, a click operation) by the user on the "Connect now" control, the notebook computer 10 searches for all nearby devices that support screen projection, and displays identifiers (for example, device names) of the one or more found devices to the user for selection. As shown in FIG. 3C, the notebook computer 10 finds the smart TV 20 and displays an identifier of the smart TV 20.

It is to be noted that, the embodiments of this application are illustrated by using the name of "computer manager APP" as an example, but other APPs with the same or similar functions are also applicable to the embodiments of this application. In addition, the embodiments of this application are illustrated by using the name of "Connect now" as an example, but other names with the same or similar functions, such as "One-key screen projection" and "Enable screen projection", are also applicable to the embodiments of this application.

In some embodiments, if the notebook computer 10 has other entries for enabling the screen projection function, a screen projection operation may alternatively be inputted through the other entries. For example, there is a function button for enabling screen projection on a Windows setting interface.

In some scenarios, if the user intends to project display content of a mobile phone onto the screen of the smart TV, the foregoing screen projection operation may be inputted through a "wireless screen projection" or "mirror screen projection" switch in the mobile phone.

Further, as shown in FIG. 3C, the notebook computer 10 receives an operation that the user selects (for example, clicks) the identifier of the device 20 (that is, the smart TV).

In some embodiments, the user may alternatively input a selection operation on the smart TV through voice. For example, the user inputs "device 2" through voice by using a microphone of a PC. After the microphone receives the sound signal, the sound signal may be converted into an electrical signal and sent to the computer manager APP.

Further, in response to the foregoing selection operation, the notebook computer 10 establishes a screen projection connection with the smart TV 20.

Further, the notebook computer 10 acquires to-be-projected data (which is referred to as a screen projection image), and sends the to-be-projected data to the smart TV, so that the smart TV displays the screen projection image.

Optionally, the notebook computer 10 may perform screen projection to the smart TV 20 according to the mirror mode or the extension mode selected by the user.

Figure 3D:
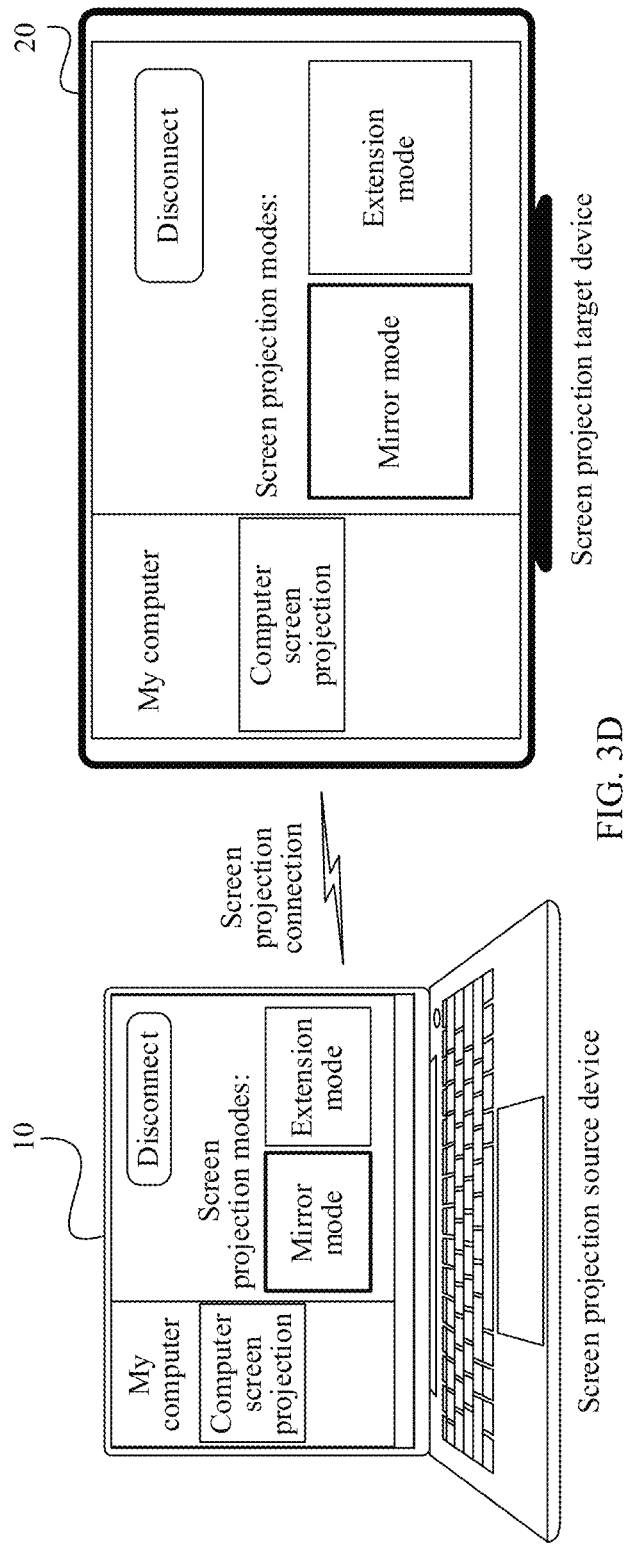

As shown in FIG. 3D, in the mirror mode, screen content of the notebook computer 10 may be mirrored and displayed on the smart TV 20, and in this case, the screen display content of the two devices is maintained consistent.

Figure 3E:
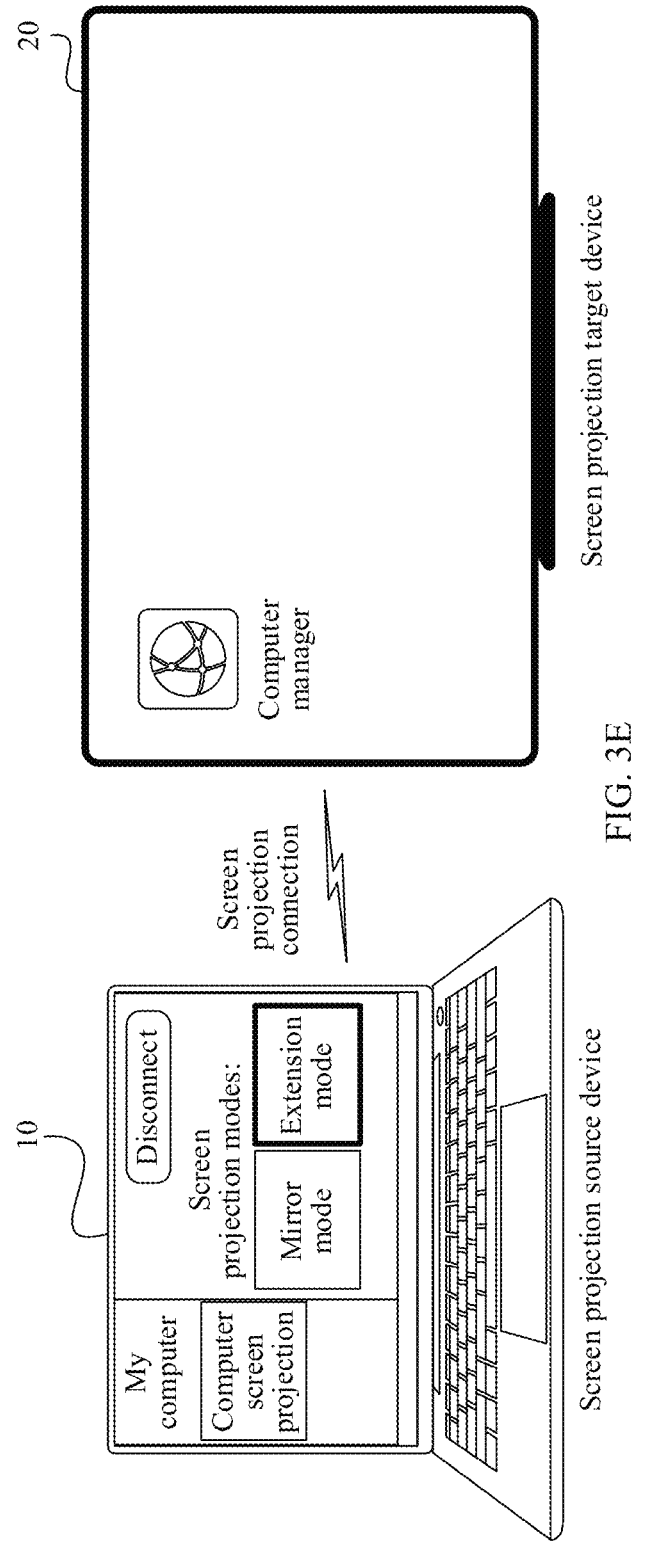

As shown in FIG. 3E, in the extension mode, the screen content of the notebook computer 10 may be extended and displayed on the smart TV 20, and in this case, the screen display content of the two devices may be different.

As described above, the screen projection source device first establishes a screen projection connection with the screen projection target device through the screen projection application, and then the screen projection source device performs screen projection to the screen projection target device through the screen projection application.

In some scenarios, if the user no longer needs to project a PC screen to the smart TV, as shown in FIG. 3D or FIG. 3E above, the user may click a "Disconnect" button on the interface of the computer manager APP. After receiving the disconnection operation, the computer manager APP sends a disconnection message to a connection discovery module of the PC, and the connection discovery module of the PC may invoke the capability of a Wi-Fi chip to disconnect a Wi-Fi P2P connection with the smart TV.

After the screen projection source device first establishes the screen projection connection with the screen projection target device through the screen projection application, the screen projection source device may perform screen projection to the screen projection target device through the screen projection application. A process of screen projection between the screen projection source device and the screen projection target device and a process of exiting the screen projection are exemplarily described below with reference to FIG. 4 and FIG. 5.

Figure 4:
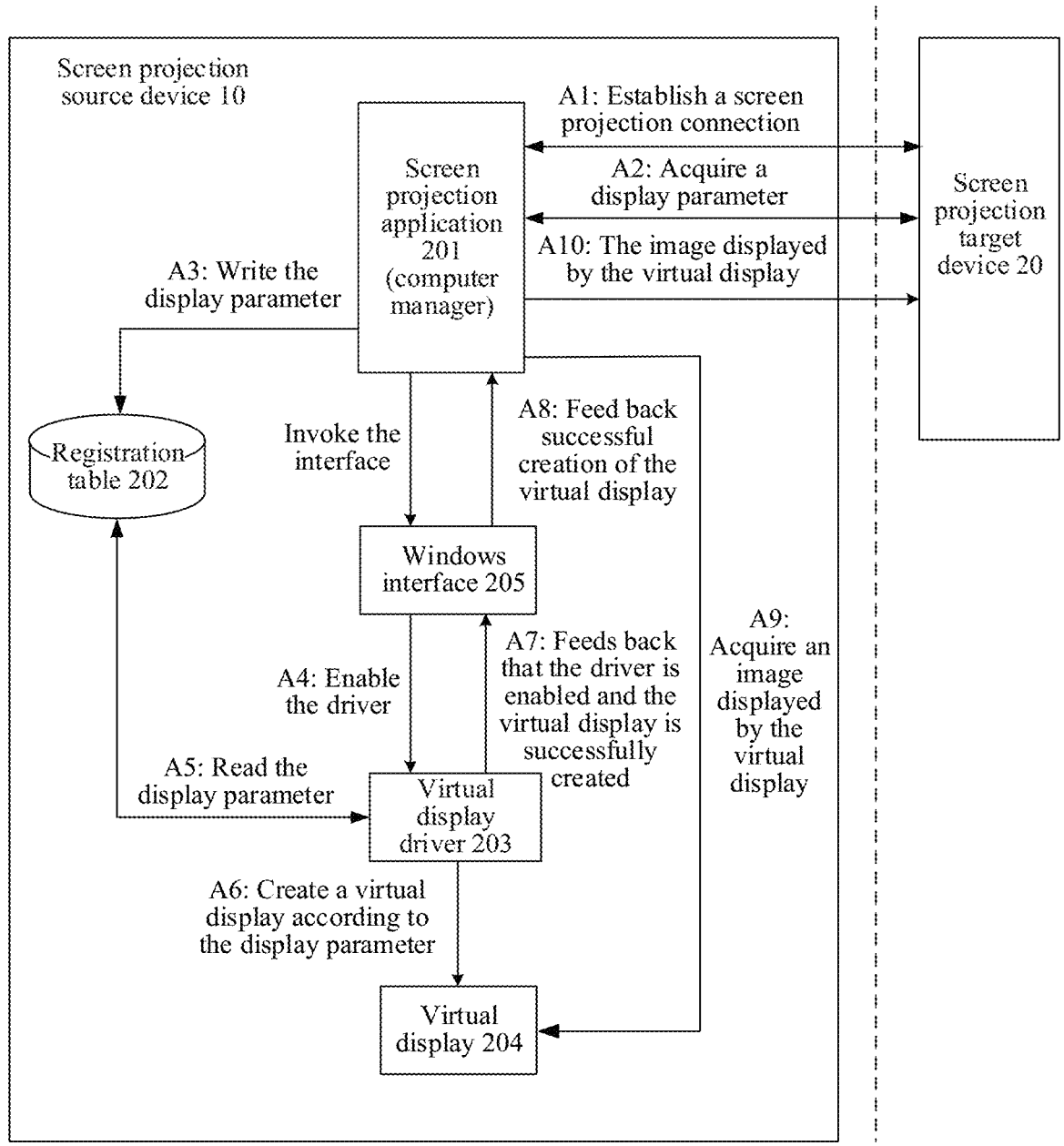
FIG. 4 is a schematic flowchart of interaction between modules in a screen projection exception processing method according to an embodiment of this application.

As shown in FIG. 4, the screen projection source device 10 includes a screen projection application 201, a registration table 202, a virtual display driver 203 (which is also referred to as a virtual display driver), and a Windows interface 205 for implementing a screen projection function. The specific process in which the screen projection source device performs screen projection to the screen projection target device through the screen projection application (step S101) is described below based on the process of interaction between these modules in the screen projection source device 10 and the process of interaction between these modules and the screen projection target device 20. The interaction processes may include the following steps A1 to A10.

Step A1: The screen projection source device 10 establishes a screen projection connection with the screen projection target device 20 through the screen projection application 201 (for example, a computer manager).

How to perform the screen projection connection will be described below in detail with reference to FIG. 11, FIG. 12A, and FIG. 12B, and details are not described herein.

After the wireless screen projection connection is established, the screen projection target device 20 sends a display parameter (which is also referred to as display parameter) of the screen projection target device 20 to the screen projection source device 10. For example, the display parameter of the screen projection target device 20 may include a display size, resolution, a refresh rate, and the like of a display screen.

Step A2: The screen projection source device 10 acquires a display parameter of the screen projection target device 20 through the screen projection connection.

Step A3: The screen projection application 201 writes the display parameter of the screen projection target device 20 into the registration table 202 of a preset path.

The registration table 202 is a storage area for storing data. For example, the registration table may be in the form of a database.

Step A4: The screen projection application 201 invokes the Windows interface 205 to set the virtual display driver 203 to an enabled state.

Step A5: The virtual display driver 203 reads the display parameter of the screen projection target device 20 from the registration table 202 of the preset path.

Step A6: The virtual display driver 203 creates a virtual display 204 according to the display parameter of the screen projection target device 20.

A display parameter of the virtual display 204 is consistent with the display parameter of the screen projection target device 20.

In this embodiment of this application, the computer manager APP sets the virtual display driver to the enabled state through a screen projection interface. In the enabled state, the virtual display driver may read the display parameter in the registration table and create a virtual display according to the display parameter. Therefore, the display parameter of the virtual display is consistent with the display parameter of the screen projection target device. In this way, it can be ensured that the screen projection target device displays screen projection data with an adapted display parameter, which can improve the screen projection display effect.

Step A7: The virtual display driver 203 feeds back to the Windows interface 205 that: the driver is enabled and the virtual display is successfully created.

Step A8: The Windows interface 205 feeds back to the screen projection application 201 that: the virtual display is successfully created.

Step A9: The screen projection application 201 acquires an image displayed by the virtual display 204.

The image displayed by the virtual display 204 may be an image being displayed on the screen of the screen projection source device 10.

A frequency at which the screen projection application captures images of the virtual display may be consistent with a display refresh rate of the screen projection target device. In this way, it can be ensured that the screen projection target device has a good display effect during screen projection display. For example, if the display refresh rate of the screen projection target device is 60 Hz, the screen projection application can capture 60 frames of images per second on the virtual display.

Step A10: The screen projection application 201 sends the image displayed by the virtual display 204 to the screen projection target device 20 through the screen projection connection.

In this embodiment of this application, the screen projection application 201 may periodically acquire an image displayed by the virtual display 204, and send the image displayed by the virtual display 204 to the screen projection target device 20 through a wireless screen projection connection channel. In this way, after the screen projection target device 20 receives the image displayed by the virtual display 204, the screen projection target device 20 displays the image, thereby implementing screen projection display between the screen projection source device 10 and the screen projection target device 20.

For example, an example in which the screen projection application in the screen projection source device is a computer manager APP is used. After a screen projection connection is established through the computer manager APP, the screen projection target device sends display parameters such as the resolution and the refresh rate of the screen projection target device to the screen projection source device. The computer manager APP of the screen projection source device may write the display parameters of the screen projection target device into the registration table according to the preset path. In addition, the computer manager APP switches the state of the virtual display driver from the disabled state to the enabled state. Subsequently, the virtual display driver reads the display parameters of the screen projection target device from the registration table, and further, the virtual display driver may create a virtual display according to the display parameters of the screen projection target device. Subsequently, the computer manager APP captures an image displayed by the virtual display, and sends the image to the screen projection target device for display.

Figure 5:
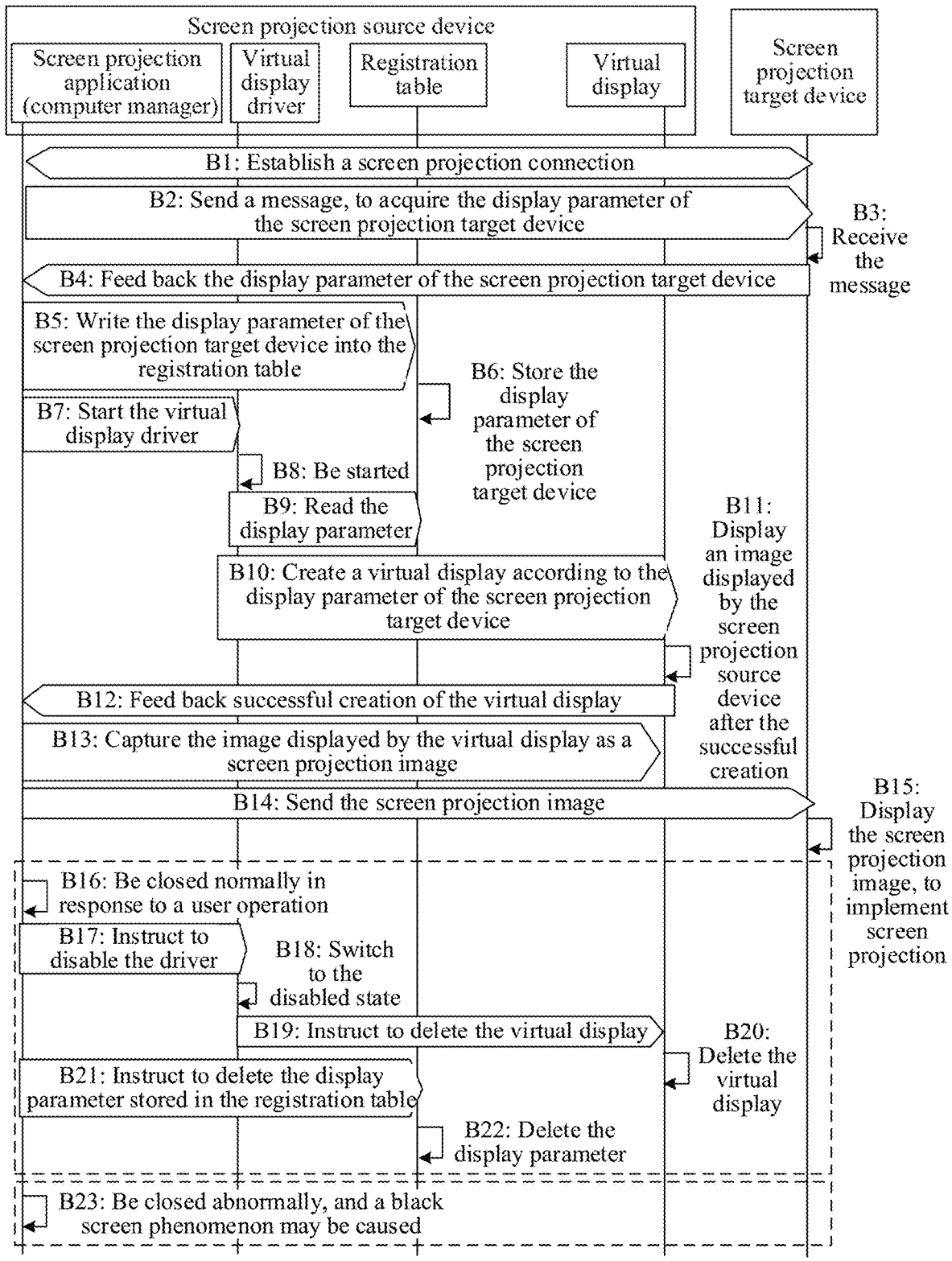
FIG. 5 is another schematic diagram of interaction between modules in a screen projection exception processing method according to an embodiment of this application.

FIG. 5 is a schematic diagram of a process of screen projection and a process of exiting the screen projection involved in an embodiment of this application. As shown in FIG. 5, the process of steps B1 to B15 describe the implementation process of steps A1 to A10 in FIG. 4 in detail, and details are not described herein again. Steps B16 to B22 in FIG. 5 describe the process of normal exit from the screen projection, and step B23 in FIG. 5 describes the process of abnormal exit from the screen projection. In practical applications, steps B16 to B22 may be performed, or step B23 may be performed.

Step B16: The screen projection application is closed normally in response to a user operation.

For example, the user may click a "Disconnect" control displayed in a screen projection UI of the computer manager to trigger normal exit from the screen projection. Subsequently, the screen projection connection between the screen projection source device and the screen projection target device is disconnected.

Step B17: The screen projection application instructs to disable the virtual display driver.

The screen projection application may disable the virtual display driver by invoking the Windows interface.

Step B18: The virtual display driver switches from the enabled state to the disabled state.

Step B19: The virtual display driver instructs to delete the virtual display.

Step B20: Delete the virtual display.

Step B21: The screen projection application instructs to delete the display parameter stored in the registration table.

Step B22: Delete the display parameter stored in the registration table.

The execution order of that the screen projection application instructs to disable the virtual display driver in B17 and that the screen projection application instructs to delete the display parameter stored in the registration table in B22 is not limited in this embodiment of this application.

In this way, the normal exit from the screen projection service is completed.

Step B23: The screen projection application is closed abnormally.

In some scenarios, during screen projection, the screen projection application may be closed abnormally for some reason, which results in abnormal exit from the screen projection service. In a case that the screen projection application is closed abnormally, the foregoing steps B17 to B22 will not be performed. In other words, the virtual display driver may still be in the enabled state, so that the virtual display still exists, and the display parameter is still stored in the registration table, which will all cause an abnormal screen projection phenomenon, for example, the foregoing black screen phenomenon.

S102: The screen projection source device re-enables the screen projection application in a case that the screen projection application is closed abnormally.

When the screen projection source device performs wireless screen projection to the screen projection target device, the screen projection application in the screen projection source device may be closed abnormally for some reason. In this case, the screen projection source device may re-enable the screen projection application.

Optionally, the screen projection source device may re-enable the screen projection application in response to a triggering operation of the user. Alternatively, when the screen projection source device detects that the screen projection application is closed abnormally, the screen projection source device automatically restarts the screen projection application without user triggering. Details may be determined according to an actual use requirement, and this is not limited in this embodiment of this application.

In this embodiment of this application, the screen projection source device disconnects a screen projection connection with the screen projection target device in a case that the screen projection application is closed abnormally. Therefore, the scenario after the screen projection application is closed abnormally is a non-screen projection scenario. Certainly, after the screen projection application is re-enabled, because the screen projection connection between the screen projection source device and the screen projection target device has been disconnected, the current scenario after the screen projection application is re-enabled is also a non-screen projection scenario.

S103: The screen projection source device sets a state of a virtual display driver to a disabled state through the screen projection application in a case that the screen projection application detects that the virtual display driver is in an enabled state.

It is to be noted that, during delivery of the electronic device, the virtual display driver may be pre-loaded in the electronic device, and the virtual display driver is usually set to the disabled state. In actual implementation, when a user operation triggers screen projection of the electronic device, the electronic device switches the virtual display driver to the enabled state, and creates a virtual display through the virtual display driver to implement wireless screen projection.

After the screen projection application is closed abnormally, the virtual display driver may still be in the enabled state. Therefore, after the screen projection application is restarted, the screen projection application may detect the state of the virtual display driver.

The following describes a possible implementation of the screen projection application for detecting the state of the virtual display driver. For example, the drive state detection may be implemented through the following Windows application programming interfaces (application programming interface, API): SetupDiGetClassDevsEx; SetupDiEnumDeviceInfo; and CM_Get_DevNode_Status.

The process of detecting the state of the virtual display driver through the API will be described below in detail.

1>. A device information set hDevInfo is acquired through SetupDiGetClassDevsEx(NULL, NULL, NULL, DIGCF_ALLCLASSES|DIGCF_PRESENT, NULL, NULL, NULL).

2>. Corresponding device information is queried through the SetupDiEnumDeviceInfo(hDevInfo,dwDevID, &DevInfoData) interface according to a hardware device Id dwDevID of the virtual display driver.

3>. The device state dwProblem is acquired through CM_Get_DevNode_Status(&dwDevStatus,&dwProblem,DevInfoData.DevInst,0). When DwDevStatus has a DN_HAS_PROBLEM state, and dwProblem=CM_PROB_DISABLED, it can be determined that the virtual display driver is in the disabled state. On the other hand, when the DwDevStatus does not have the DN_HAS_PROBLEM state or the dwProblem is not CM_PROB_DIABLED, it can be determined that the virtual display driver is in the enabled state.

It may be understood that the foregoing drive state detection manners are exemplarily listed. Details may be determined according to an actual use requirement, and this is not limited in this embodiment of this application.

Combined with the solution of this application, during screen projection, the screen projection application of the screen projection source device may invoke the Windows interface to modify the state of the virtual display driver to the enabled state. The specific operation is: making DwDevStatus not have the DN_HAS_PROBLEM state, or dwProblem not be CM_PROB_DIABLED.

In a case of normal exit from the screen projection, the screen projection application of the screen projection source device may invoke the Windows interface to modify the state of the virtual display driver to the disabled state. For example, the Windows interface is invoked to modify the information DwDevStatus and the information dwProblem, so that DwDevStatus has the DN_HAS_PROBLEM state, and dwProblem=CM_PROB_DISABLED, so as to switch the virtual display driver from the enabled state to the disabled state.

In a case of abnormal exit from screen projection, the screen projection application of the screen projection source device will not modify the state of the virtual display driver to the disabled state according to the foregoing conventional operations. That is, the virtual display driver may still be in the enabled state. Correspondingly, DwDevStatus does not have the DN_HAS_PROBLEM state, or dwProblem is not CM_PROB_DISABLED.

It may be understood that, by detecting DwDevStatus and dwProblem, whether the state of the virtual display driver is the enabled state or the disabled state can be determined.

In this embodiment of this application, based on actual detection, it can be seen that after the screen projection application is closed abnormally, the virtual display driver may still be in the enabled state. Therefore, this application provides that: after the screen projection application is started, it is necessary to query the state of the virtual display driver, when it is detected that the virtual display driver is in the enabled state, it can be determined that the screen projection application has been closed abnormally before; and in this case, the state of the virtual display driver needs to be set to the disabled state, to prevent the virtual display driver in the enabled state from affecting the normal use of the screen projection source device.

It is to be noted that, after the screen projection source device sets the state of the virtual display driver to the disabled state through the screen projection application, in a case that the virtual display driver is in the disabled state, the screen projection source device prohibits the virtual display driver from creating a virtual display. In other words, the virtual display driver program is closed, and can no longer create a virtual display.

Because after the screen projection application is closed abnormally and re-enabled, the screen projection application has set the state of the virtual display driver to the disabled state, the virtual display driver will no longer create a virtual display. Therefore, in a case that no virtual display exists, the screen projection source device cannot capture an image for screen projection from the virtual display, which can avoid a black screen event caused to the screen projection source device by the existence of a virtual display.

Figure 6:
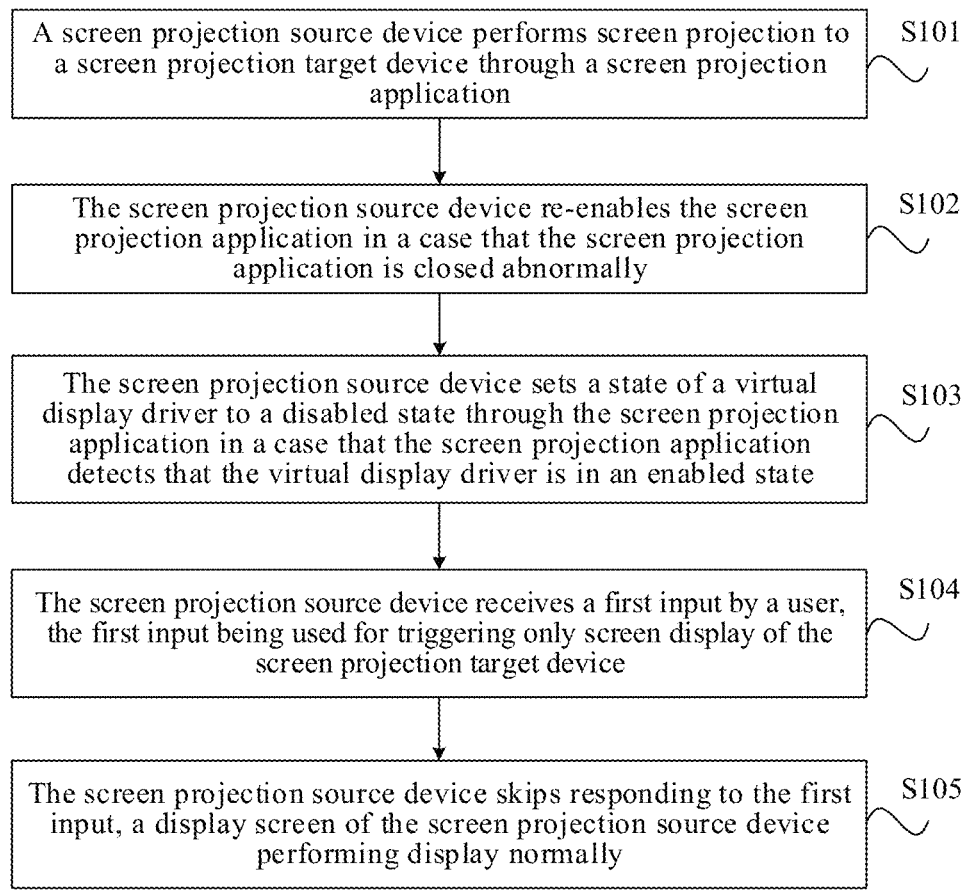
FIG. 6 is another schematic flowchart of a screen projection exception processing method according to an embodiment of this application.

Optionally, after the screen projection source device sets the state of the virtual display driver to the disabled state through the screen projection application (that is, the foregoing step S103), with reference to FIG. 2 and as shown in FIG. 6, the foregoing method may further include the following step S104 and step S105.

S104: The screen projection source device receives a first input by a user, the first input being only used for triggering screen display of the screen projection target device.

The first input may include a first sub-input and a second sub-input. The first sub-input may be that: the user presses a Windows+P key to trigger the screen projection source device to display a plurality of screen projection options, such as an "Only the local screen for display" option, a "Copy" option, an "Extend" option, and an "Only the second screen for display" option. The second sub-input may be that the user selects the "Only the second screen for display" option. In this way, only the screen of the screen projection target device is triggered for display.

S105: The screen projection source device skips responding to the first input, a display screen of the screen projection source device performing display normally.

Because after the screen projection application is closed abnormally and re-enabled, the screen projection application has set the state of the virtual display driver to the disabled state, the virtual display driver will no longer create a virtual display. Therefore, in a case that no virtual display exists, the screen projection source device cannot capture an image for screen projection from the virtual display, so that even if the user performs an operation on the screen projection source device to only trigger the screen of the screen projection target device for display, the screen projection source device will not respond to the user operation.

That is, in the current non-screen projection scenario, when the user selects the "Only the second screen for display" option in the screen projection function of the screen projection source device, the display screen of the screen projection source device can perform display normally without a black screen phenomenon.

It is to be noted that, in this embodiment of this application, the registration table may be used for storing display parameters for wireless screen projection. During screen projection, the screen projection source device may store the display parameter of the screen projection target device in the registration table, and correspondingly, the virtual display driver of the screen projection source device may perform reading from the registration table, and create a virtual display based on the read display parameter, so that the display parameter of the virtual display can be consistent with the display parameter of the screen projection target device. Therefore, when an image displayed by the virtual display is sent to the screen projection target device for display, a relatively good screen projection display effect can be ensured.

For example, the display parameters stored in the registration table may include the following content:
1) "Width", which is in the data format of dword, and represents a resolution width, for example, 1920 (the quantity of pixels);
2) "Height", which is in the data format of dword, and represents a resolution height, for example, 1080 (the quantity of pixels);
3) "Ratio", which is in the data format of dword, and represents a screen ratio, for example, 0, representing 4:3;
4) "HDisplay Size", which is in the data format of dword, and represents a screen width, for example, 300 mm;
5) "VDisplaySize", which is in the data format of dword, and represents a screen height, for example, 200 mm; and
6) "PixelRate", which is in the data format of dword, and represents a refresh rate, for example, 60 Hz.

Optionally, a corresponding storage path may be preset for the registration table. Certainly, custom setting of paths for storage is also supported.

For example, the path of the registration table may be represented by the following path information:
[HKEY_LOCAL_MACHINESOFTWARE\
PCManager\Drivers\IDDSettings].

Optionally, after the screen projection application is closed abnormally and re-enabled, the registration table still stores display parameters of the latest wireless screen projection, so that in the current non-screen projection scenario, the display parameters in the registration table may be deleted to prevent the display parameters in the registration table from affecting the normal use of the screen projection source device.

Figure 7:
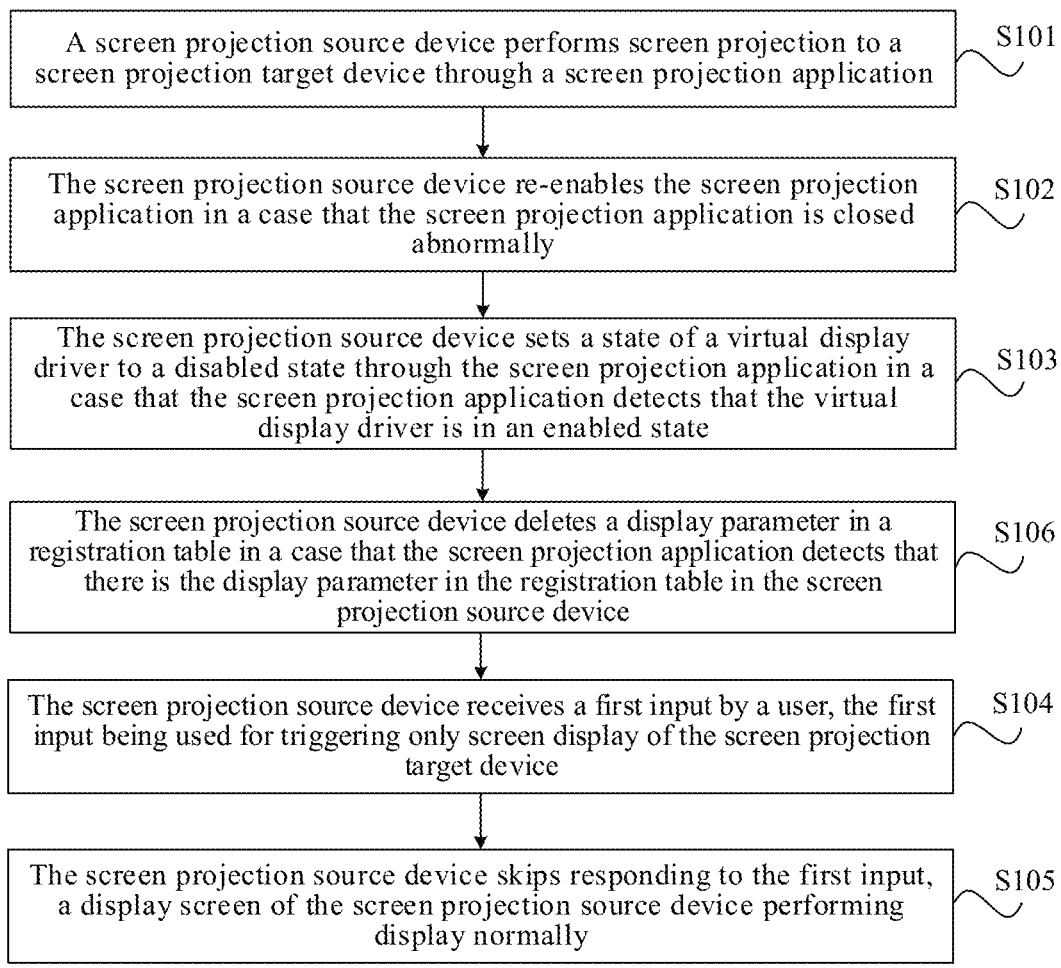
FIG. 7 is another schematic flowchart of a screen projection exception processing method according to an embodiment of this application.

In this embodiment of this application, with reference to FIG. 6, as shown in FIG. 7, after S103, the method may further include the following step S106.

S106: The screen projection source device deletes a display parameter in a registration table in a case that the screen projection application detects that there is the display parameter in the registration table in the screen projection source device.

For example, in a case that the computer manager APP is closed abnormally, when the computer manager APP is re-enabled, the computer manager APP may check whether there is a virtual display in the screen projection source device, and if there is a virtual display in the screen projection source device, the display parameter in the registration table is cleared and the virtual display driver is closed.

Figure 8:
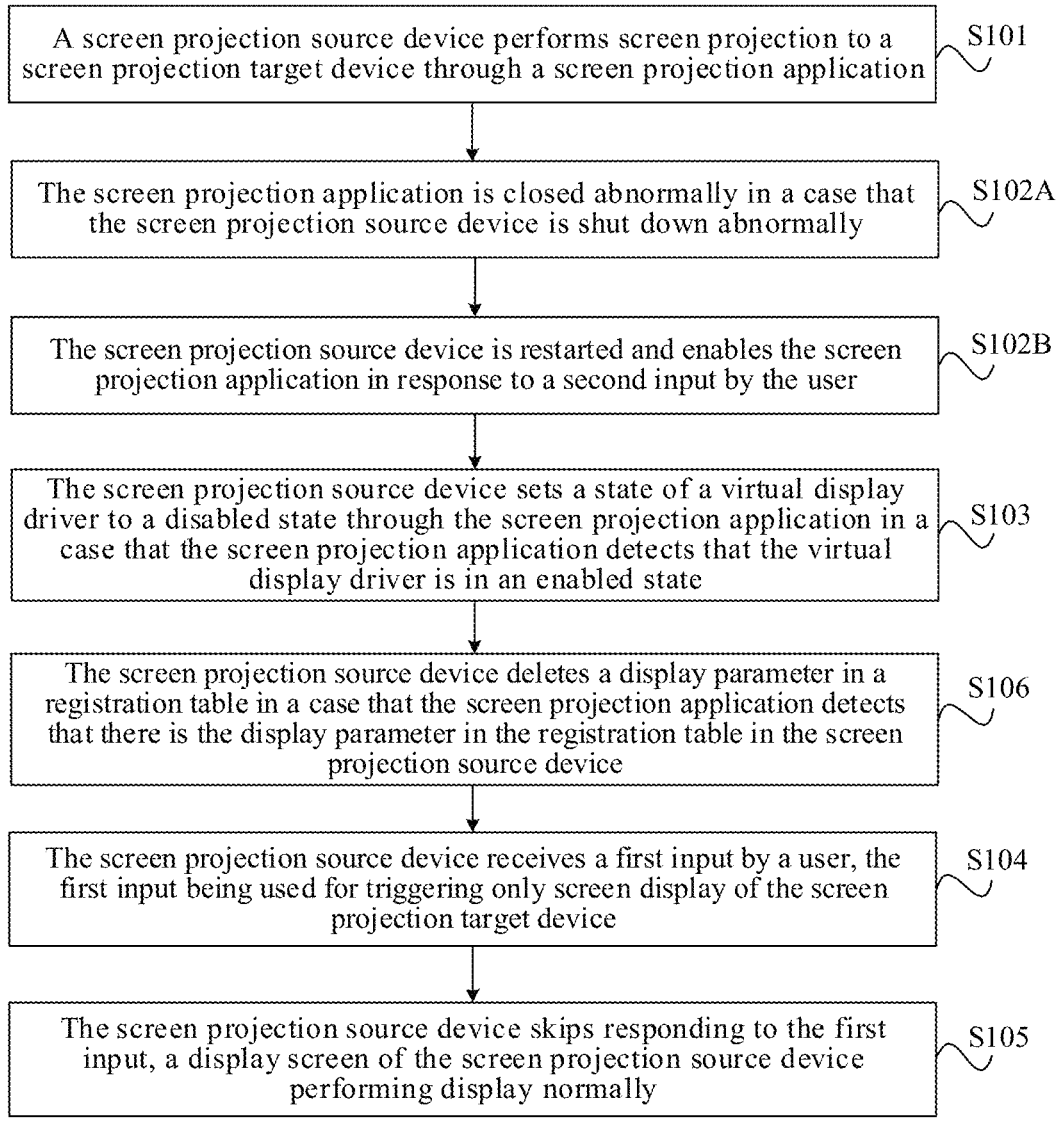
FIG. 8 is another schematic flowchart of a screen projection exception processing method according to an embodiment of this application.

Optionally, with reference to FIG. 7 and as shown in FIG. 8, when the screen projection application is closed abnormally, that the screen projection source device re-enables the screen projection application (the foregoing step S102) may specifically include the following steps S102A and S102B.

S102A: The screen projection application is closed abnormally in a case that the screen projection source device is shut down abnormally.

For example, the abnormal closing of the screen projection application may be triggered by an irregular shutdown operation of the user, or may be triggered by the shutdown of the device due to a power failure, or the screen projection application may be closed due to a program crash, or the abnormal closing may be triggered due to any other possible factor. This is not limited in this embodiment of this application.

S102B: The screen projection source device is restarted and enables the screen projection application in response to a second input by the user.

The second input is used for triggering the screen projection source device to be restarted, and in a case that the screen projection source device is restarted, the screen projection source device triggers the screen projection application to be automatically enabled. After the screen projection application is automatically enabled, in a non-screen projection scenario, the virtual display driver may be disabled and the relevant registration table data items may be cleared, to prevent a black screen problem that appears when the user uses the Windows+P key to select only the second screen for display in a non-screen projection scenario.

Figure 9:
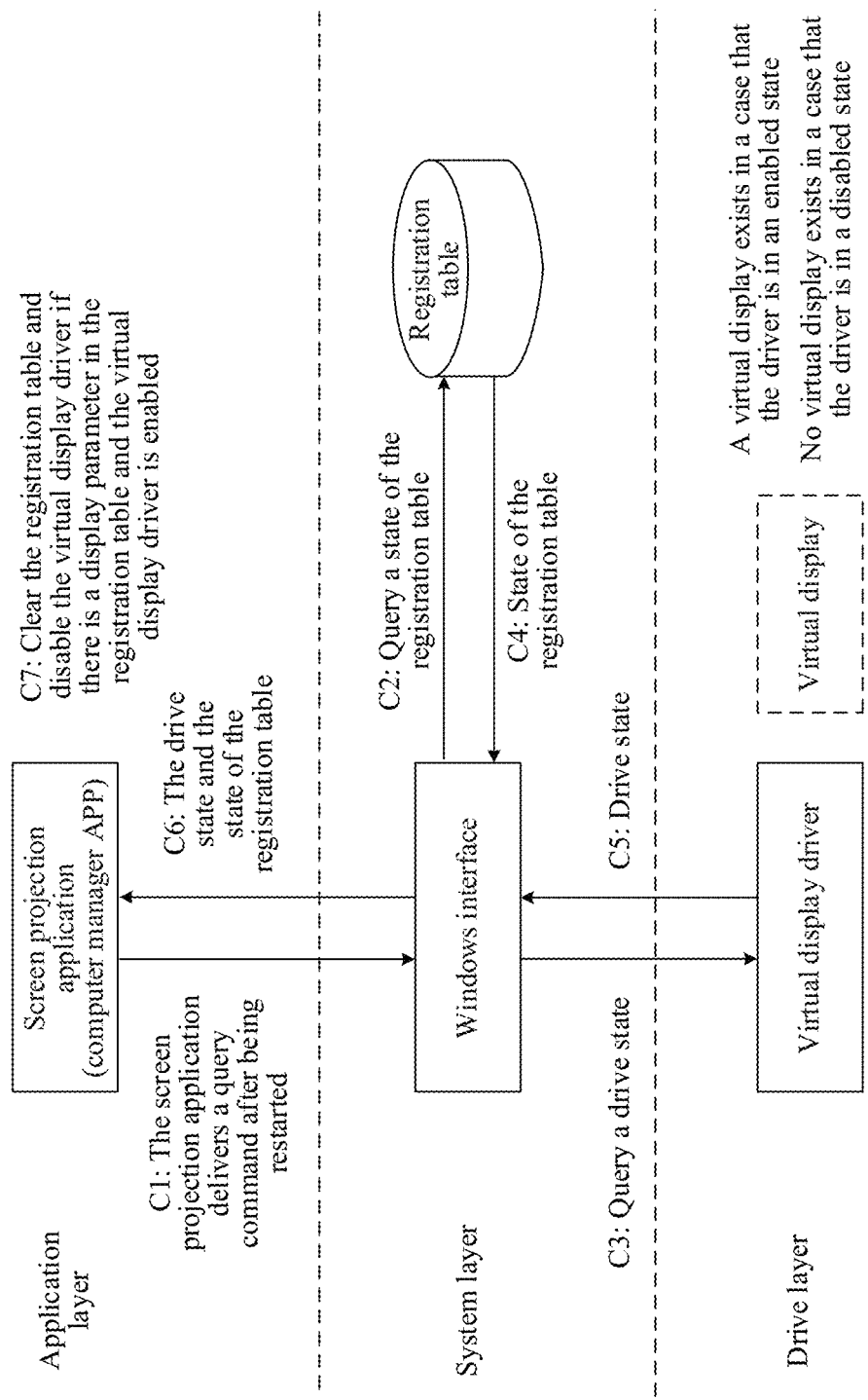
FIG. 9 is a schematic diagram of a system architecture to which a screen projection exception processing method is applied according to an embodiment of this application.
Figure 10:
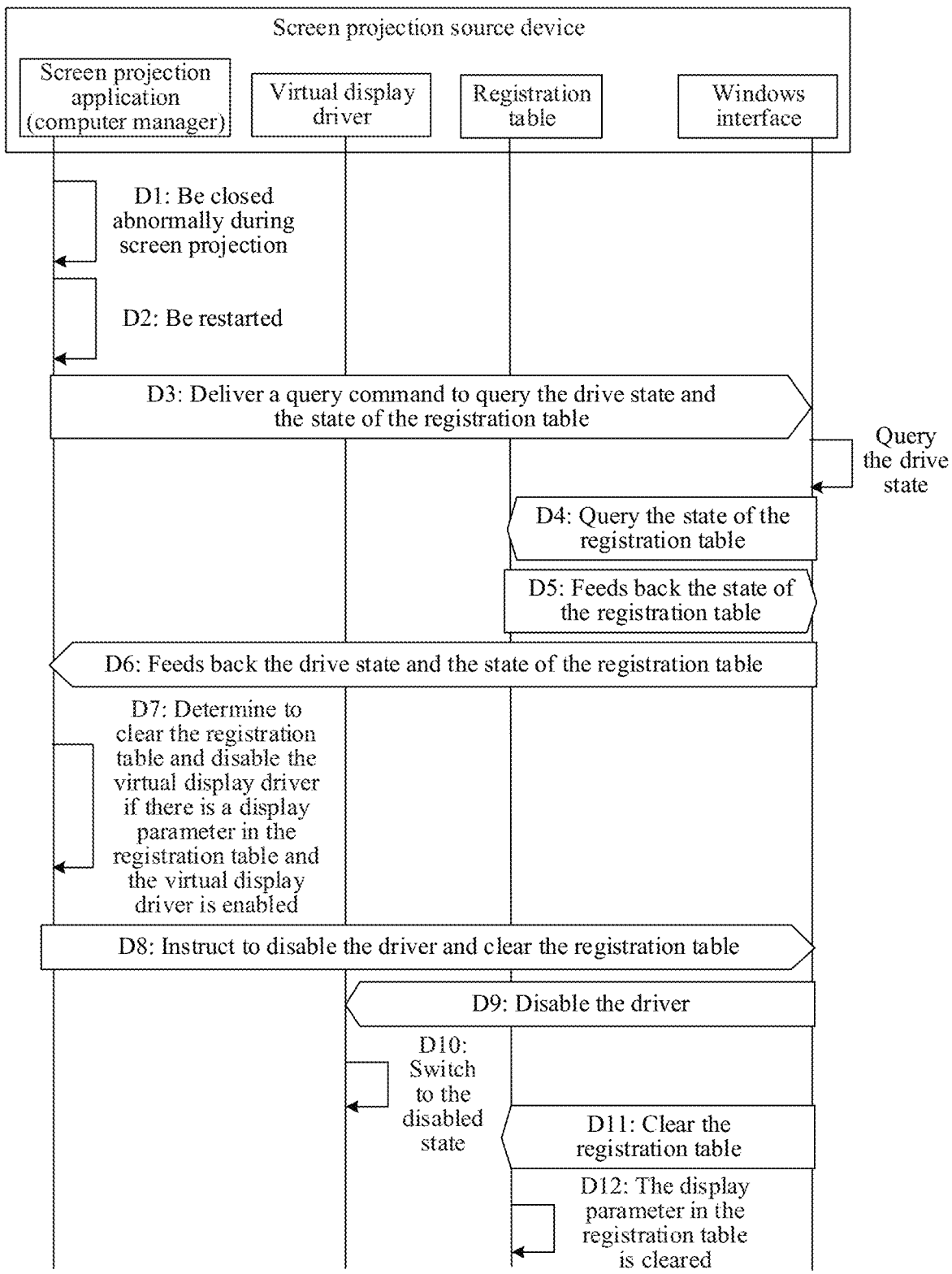
FIG. 10 is a schematic flowchart of interaction between modules in a screen projection exception processing method according to an embodiment of this application.

FIG. 9 and FIG. 10 are schematic architectural diagrams of interaction between modules of layers in the screen projection source device. With reference to FIG. 9 and FIG. 10, the following describes how the screen projection source device processes the screen projection exception situation after the screen projection application is restarted, to avoid the black screen problem that appears when the user uses the Windows+P key to select only the second screen for display in a non-screen projection scenario.

As shown in FIG. 9, the screen projection source device includes an application layer, a system layer, and a drive layer. The application layer includes the screen projection application (for example, a computer manager APP), the system layer includes the Windows interface and the registration table, and the drive layer includes the virtual display driver and the virtual display. The process of interaction between the modules of the layers may include the following steps C1 to C7.

Step C1: The screen projection application delivers a query command to the Windows interface after being restarted.

In a case that the screen projection application (for example, a computer manager APP) of the screen projection source device is closed abnormally during screen projection, the screen projection application may be restarted, and deliver a query command to the Windows interface of the screen projection source device after being restarted. The query command is used for instructing to query a state of the registration table and query the state of the virtual display driver.

Step C2: The Windows interface sends a query command to the registration table, to query a state of the registration table.

The registration table includes the following two states: there is a display parameter in the registration table, or there is no display parameter in the registration table.

Step C3: The Windows interface queries the drive state of the virtual display driver.

The virtual display driver may include the following two drive states: a disabled state or an enabled state.

It is to be noted that, the execution order of step C2 and step C3 is not limited in this embodiment of this application. For example, step C2 may be performed first, and then step C3 may be performed; or step C3 may be performed first, and then step C2 may be performed; or step C2 and step A3 may be performed simultaneously. This is not limited in this embodiment of this application.

Step C4: The registration table feeds the state of the registration table back to the Windows interface according to the query command.

For example, the registration table feeds the state of the registration table back to the Windows interface as: there is a display parameter in the registration table.

Step C5: The Windows interface finds the drive state of the virtual display driver.

For example, the Windows interface finds that the drive state of the virtual display driver is the enabled state.

Step C6: The Windows interface reports the found state of the registration table and the found state of the virtual display driver to the screen projection application.

Step C7: The screen projection application receives the state of the registration table and the state of the virtual display driver, and if there is a display parameter in the registration table and the virtual display is in the enabled state, the screen projection application clears the registration table and disables the virtual display driver.

As shown in FIG. 10, the process of interaction between the modules of the screen projection source device may include the following steps D1 to D11.

Step D1: The screen projection application (for example, a computer manager) is closed abnormally during screen projection.

The screen projection application may be closed abnormally during screen projection due to a system crash, or due to abnormal shutdown of the screen projection source device.

Step D2: The screen projection application is restarted.

The screen projection source device is automatically started after being shut down, and may alternatively be restarted in response to a user triggering operation.

Step D3: The screen projection application delivers a query command to the Windows interface, to query the state of the registration table and the drive state of the virtual display driver.

Step D4: The Windows interface receives the query command, and queries the state of the registration table.

Step D5: The registration table feeds the state of the registration table back to the Windows interface.

Because the Windows interface records the drive state of the virtual display driver, the Windows interface may directly find the drive state of the virtual display driver according to the recorded information.

Step D6: The Windows interface feeds the state of the registration table and the drive state of the virtual display driver back to the screen projection application.

Step D7: The screen projection application performs the following processing according to the state of the registration table and the drive state of the virtual display driver: if the state of the registration table is that there is a display parameter in the registration table and the drive state of the virtual display driver is the enabled state, the screen projection application determines to clear the display parameter in the registration table and disable the virtual display driver.

Step D8: The screen projection application instructs the Windows interface to switch the state of the virtual display driver to the disabled state and clear the registration table.

Step D9: The Windows interface sets the virtual display driver to the disabled state.

Step D10: The virtual display driver is switched from the enabled state to the disabled state.

Step D11: The screen projection application instructs to clear the display parameter in the registration table.

Step D12: The display parameter in the registration table is cleared.

The execution order of step D9 and step D11 is not limited in this embodiment of this application.

In this embodiment of this application, after the screen projection source device is restarted and the computer manager APP is re-enabled, the computer manager APP may check the state of the virtual display. For example, the computer manager APP notifies a Windows API (application programming interface) to acquire the state of the virtual display driver, and disables the virtual display driver and clears the relevant registration table data items to remove the virtual display in a non-screen projection scenario, thereby avoiding a black screen problem of the screen projection source device in the non-screen projection scenario.

The following describes the screen projection process involved in this embodiment of this application with reference to the system architecture of the screen projection source device (for example, a PC) and the screen projection target device (smart TV) and the process of data exchange between the modules in the system architecture. FIG. 11 is a schematic diagram of a system architecture of a PC and a smart TV. FIG. 12A and FIG. 12B are a schematic diagram of a process of establishing a connection between a PC and a smart TV, and a process of data exchange between modules in the PC and modules in the smart TV.

Figure 11:
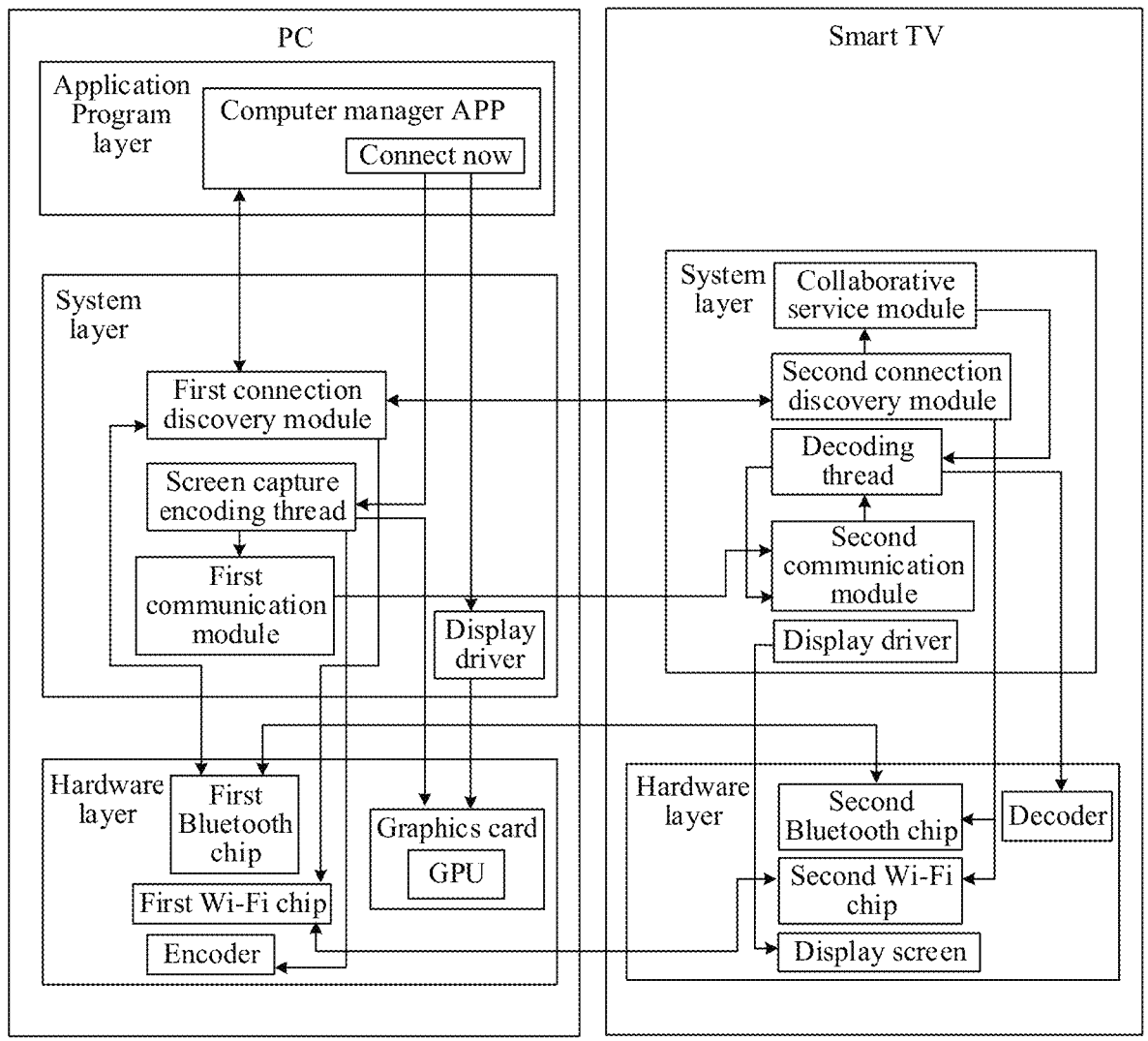
FIG. 11 is another schematic diagram of a system architecture to which a screen projection exception processing method is applied according to an embodiment of this application.

As shown in FIG. 11, the PC includes at least: a computer manager APP at an application layer; a first connection discovery module, a screen capture encoding thread, a first communication module, and a display driver at a system layer; and a graphics card (GPU), an encoder, a first Bluetooth chip, and a first Wi-Fi chip at a hardware layer. The smart TV includes at least: a collaborative service (service) module, a second connection discovery module, a second communication module, a decoding thread, and a display driver at a system layer; and a decoder, a second Bluetooth chip, a second Wi-Fi chip, and a display screen at a hardware layer.

The display driver is a drive program configured to drive the graphics card, and is the software corresponding to the hardware graphics card. This drive program is a small piece of code added to the operating system, and includes information about a graphics card device.

Figure 12A:
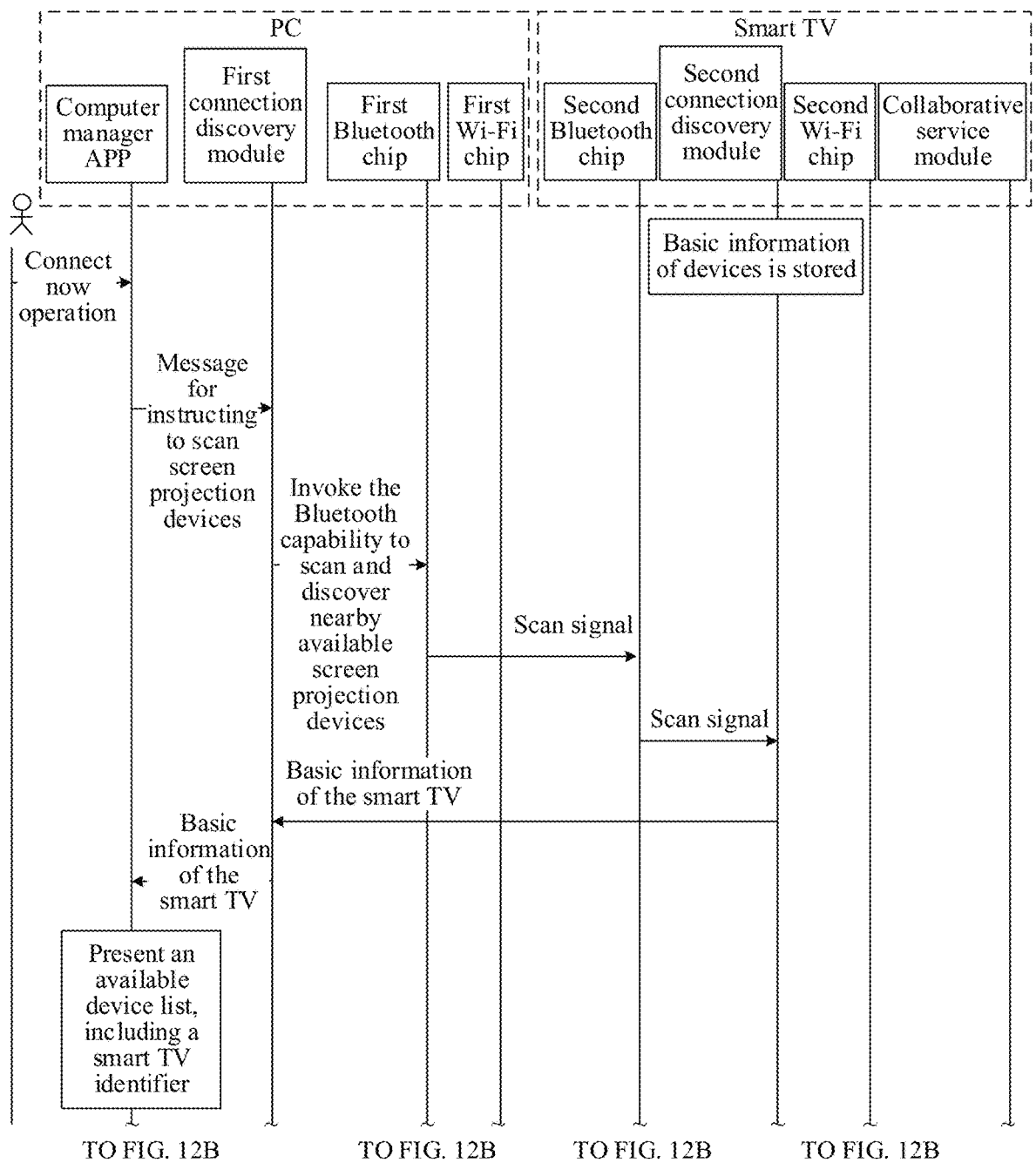
FIG. 12A and FIG. 12B are another schematic flowchart of a screen projection exception processing method according to an embodiment of this application.
Figure 12B:
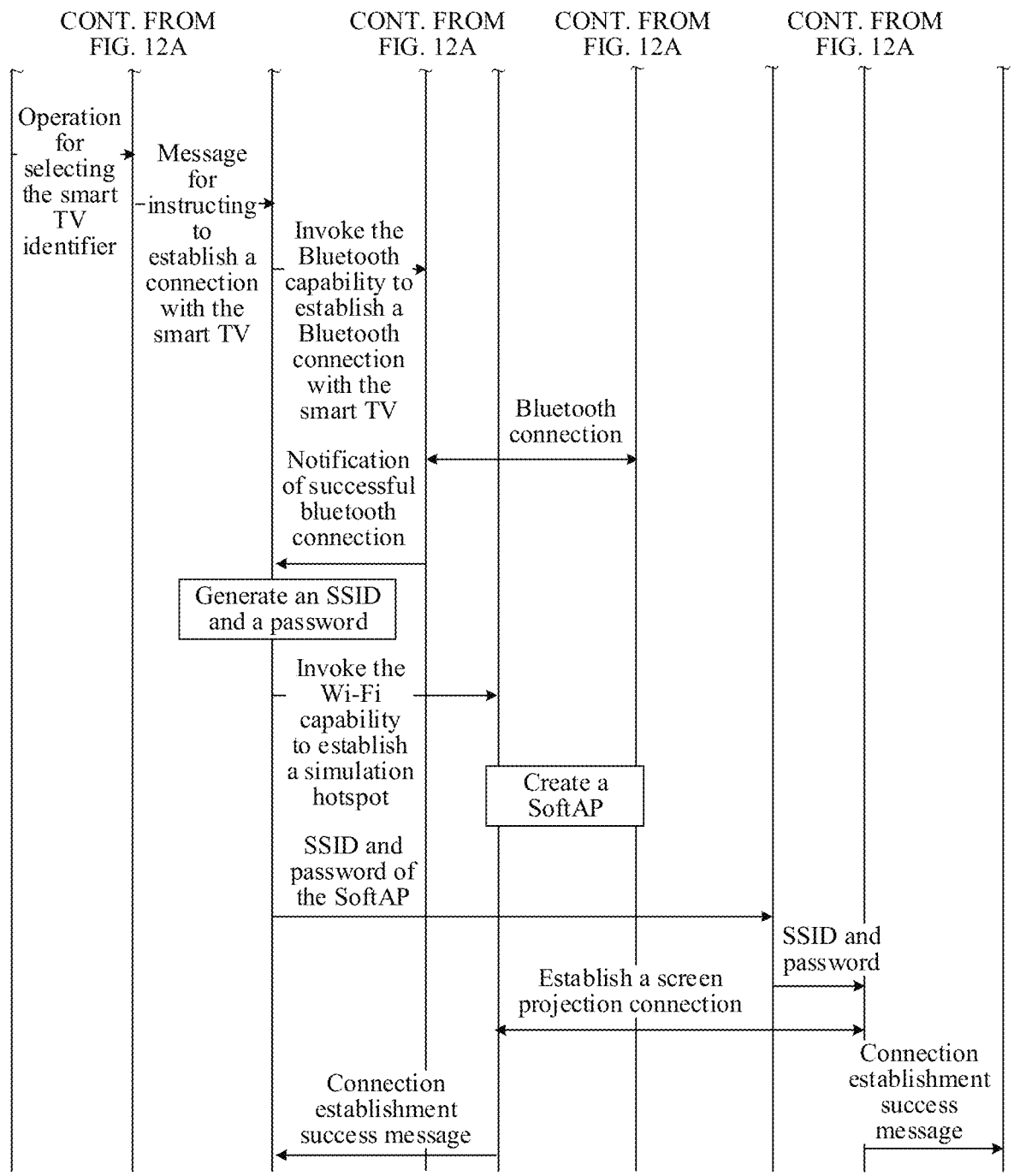

Referring to FIG. 11, FIG. 12A, and FIG. 12B, after the computer manager APP in the PC receives a "Connect now" screen projection operation inputted by the user, the computer manager APP sends an inter-process communication (inter-process communication, IPC) message to the first connection discovery module. Optionally, the IPC message may carry a scan indication instruction, which is used for instructing the first connection discovery module to invoke the capability of the first Bluetooth chip to scan and discover nearby available screen projection target devices.

After receiving the IPC message, the first connection discovery module invokes the capability of the first Bluetooth chip to scan and discover nearby available screen projection target devices. In this case, a Bluetooth chip of an available screen projection target device may receive a scan signal of the PC, and a connection discovery module of the screen projection target device (for example, a smart TV) feeds its basic information, such as an internet protocol address (internet protocol address, IP address), a media access control address (media access control address, MAC address), a universally unique identifier (universally unique identifier, UUID), a device identifier, and a device name of the screen projection target device, back to the first connection discovery module of the PC.

After the first connection discovery module of the PC finds available screen projection target devices, the first connection discovery module can acquire basic information of the screen projection target devices. Further, the first connection discovery module sends the basic information (such as device names and MAC addresses) of the discovered available screen projection target devices to the computer manager APP, and then enables the computer manager APP to display the basic information of the available screen projection target devices in an available device list to display to the user for viewing.

In some embodiments, due to the display size of the display screen of the PC, the computer manager APP may be incapable of displaying all the above information of the available screen projection target devices on the available device list. Therefore, only the device names of the available screen projection target devices may be displayed on the available device list. If the user intends to view other information of a screen projection target device, the user may perform a long press operation or double click operation on the device name. After receiving the long press operation or double click operation, the computer manager APP may display other information of the screen projection target device.

In some embodiments, the available device list displayed by the computer manager APP includes all devices with the Bluetooth function enabled near the PC, such as a smart TV, a mobile phone, or a wearable device. In some other embodiments, after receiving information of all the devices with the Bluetooth function enabled, the computer manager APP may screen devices that support screen projection for display. For example, the wearable device does not support PC screen projection, then the computer manager APP no longer displays the wearable device in the available device list.

Subsequently, when the user clicks the smart TV in the available device list, the computer manager APP may receive the click operation of the user, and send an IPC message to the first connection discovery module, where the IPC message is used for instructing the first connection discovery module to invoke the first Bluetooth chip to establish a Bluetooth connection (BLE connection) with the smart TV. Optionally, the IPC message may carry basic information of the smart TV. After receiving the IPC message, the first connection discovery module may invoke the capability of the first Bluetooth chip to perform Bluetooth connection with the second Bluetooth chip of the smart TV, to implement a communication connection, namely, a BLE connection, between the PC and the smart TV.

After the BLE connection is established between the PC and the smart TV, the first connection discovery module of the PC invokes the first Wi-Fi chip to establish a simulation hotspot (soft access point, SoftAP), where the SoftAP has a service set identifier (service set identifier, SSID) and a password; and then the first connection discovery module sends the SSID and the password to the second connection discovery module of the smart TV through an established BLE connection channel, so that the second connection discovery module invokes the second Wi-Fi chip to establish a Wi-Fi P2P connection with the PC according to the received SSID and password. In addition, a socket data channel is further established between the PC and the smart TV for subsequent data transmission between the PC and the smart TV.

It is to be noted that, the type of the connection established between the PC and the smart TV is not limited to a Bluetooth connection and a Wi-Fi P2P connection, and may alternatively be other types of connection manners, provided that data transmission between the two can be implemented.

As described above, a screen projection connection between the PC and the smart TV is successfully established. The first Wi-Fi module of the PC feeds a message that the connection between the PC and the smart TV is successfully established back to the first connection discovery module. The second Wi-Fi module of the smart TV notifies the collaborative service module of a message that the connection between the smart TV and the PC is successfully established.

In this way, after the screen projection connection between the PC and the smart TV is established, the PC needs to send image data on the display screen to the smart TV for display. Herein, in this embodiment of this application, the image data that needs to be projected to the screen is referred to as to-be-projected data.

In a possible implementation, after a Wi-Fi P2P connection is established between the PC and the smart TV, the smart TV may actively send its display parameters to the first connection discovery module of the PC through the second connection discovery module.

Subsequently, the first connection discovery module of the PC may feed a connection establishment success message back to the computer manager APP, where the message carries the display parameters of the smart TV returned by the smart TV (the resolution of the smart TV is used as an example herein); and then the computer manager APP establishes a screen capture encoding thread. After the screen capture encoding thread is created, the encoder may be initialized simultaneously, that is, the resolution of the image to be encoded is set to 2520×1680 and a default H264 encoding format is set.

In addition, after the computer manager APP receives the foregoing connection establishment success message, the resolution of the current PC graphics card may further be acquired through an interface, and a virtual display is created according to the resolution carried in the message received by the computer manager APP, where the resolution is 2520×1680.

While the first connection discovery module of the PC feeds the connection establishment success message back to the computer manager APP, the second connection discovery module of the smart TV also feeds the connection establishment success message back to the collaborative service module, and then the collaborative service module creates a decoding thread, and initializes the decoder.

Subsequently, the screen capture encoding thread acquires the to-be-projected data (for example, one frame of image data) from the graphics card (GPU) through the Windows API, and in this case, the resolution of the acquired image data is 2520×1680.

It is to be noted that, the image on the display screen of the PC is obtained after the GPU draws and renders the image data and then sends the image data for display. To send the image data to the smart TV, the GPU may store the image data in an image queue. Optionally, an image queue may be stored in the graphics card (GPU), and the image queue includes image data that needs to be displayed on the display screen of the PC. The image data may be image data sent for display after the GPU draws and renders the data that needs to be displayed on the display screen of the PC.

In some embodiments, a preset quantity (such as 6 frames) of image data may be stored in the image queue. After the screen capture encoding thread acquires one frame of image data from the image queue, the image data may be moved out of the image queue and new image data may be stored in the image queue. After the screen capture encoding thread encodes the first frame of image data, the second frame of image data and the third frame of image data may be subsequently acquired for encoding, so that the process of acquiring and encoding data is continuously performed.

Optionally, the to-be-projected data may be red green blue (RGB) image data. After acquiring the RGB image data, the screen capture encoding thread may convert the RGB image data into the NV12 format. Subsequently, the screen capture encoding thread invokes the encoder to compress and encode the to-be-projected data after format conversion, that is, encode the to-be-projected data into image data in the H264 format.

Finally, the screen capture encoding thread of the PC sends the encoded image data to the second communication module of the smart TV through the first communication module along the socket data channel. After the second communication module of the smart TV receives the encoded image data, the decoding thread decodes the image data by invoking the decoder, for example, decodes the encoded image data into image data in the NV12 format; and then the display driver is invoked, and the image data is delivered to the display screen for display.

That is, the screen capture encoding thread may acquire one frame of image data from the image queue, then invokes the encoder to encode the frame of image data, and the first communication module sends the encoded data to the smart TV. After the second communication module of the smart TV receives the encoded data, the decoder is invoked to for decoding, and then the display screen of the smart TV displays the image corresponding to the to-be-projected data.

In some embodiments, when the PC acquires the to-be-projected data and encodes the to-be-projected data, a screen capture programming thread may be started. After the screen capture encoding thread acquires one frame of image data, the encoder is immediately invoked to encode the image data, and the encoded image data is sent to the smart TV for decoding and display.

It is to be noted that, the encoding format of the encoder and the decoding format of the decoder are not limited in this embodiment of this application, provided that the process of encoding, decoding, and display can be implemented.

In this way, through the foregoing process, the process in which the PC projects the display content onto the screen of the smart TV is completed.

Specifically, in the solution of this application, when the PC performs screen projection to the smart TV through the screen projection application, if the screen projection application is closed abnormally, the PC sets the state of the virtual display driver to the disabled state and deletes the display parameter in the registration table after the screen projection application is re-enabled. In this way, the virtual display driver will no longer create a virtual display, so that the PC cannot capture an image used for screen projection in a case that no virtual display exists. Therefore, in a non-screen projection scenario after the screen projection application is restarted, when a user selects an "Only the second screen for display" option in the local screen projection function of the PC, a display screen of the PC performs display normally without a black screen phenomenon.

It is also to be noted that, in the embodiments of this application, "greater than" may be replaced with "greater than or equal to", "less than or equal to" may be replaced with "less than", or "greater than or equal to" may be replaced with "greater than", and "less than" may be replaced with "less than or equal to".

Each embodiment described herein may be an independent solution, or may be combined according to an internal logic, and these solutions all fall within the protection scope of this application.

It may be understood that, the methods and operations implemented by the electronic device in the foregoing method embodiments may also be implemented by a component (for example, a chip or a circuit) that can be used in the electronic device.

The foregoing describes the method embodiments provided in this application, and the following describes the apparatus embodiments provided in this application. It should be understood that, the descriptions of the apparatus embodiments correspond to the descriptions of the method embodiments. Therefore, for content not described in detail, reference may be made to the foregoing method embodiments. For brevity, details are not described herein again.

The solutions provided in the embodiments of this application are mainly described above from a perspective of method steps. It may be understood that, to implement the foregoing functions, the electronic device implementing the method includes corresponding hardware structures and/or software modules for performing the functions. A person skilled in the art should be aware that, in combination with the units and algorithm steps of the examples described in the embodiments disclosed in this specification, this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the protection scope of this application.

In the embodiments of this application, functional modules of the electronic device may be divided based on the foregoing method example. For example, each functional module may be divided according to each function, or two or more functions may be integrated into one processing module. The integrated module is implemented in the form of hardware, or is implemented in the form of a software functional module. It is to be noted that, module division in the embodiments of this application is an example, and is only logical function division. During actual implementation, there may be another division manner. The following descriptions are made by using an example in which functional modules are divided corresponding to functions.

Figure 13:
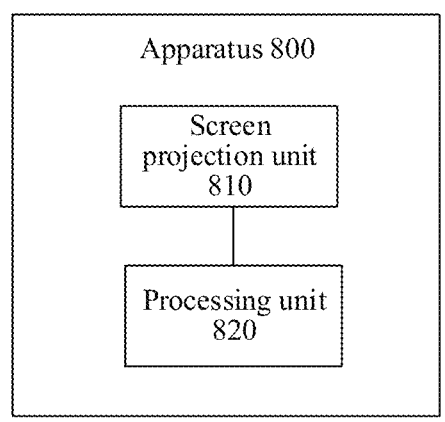
FIG. 13 is a schematic structural diagram of a screen projection exception processing apparatus according to an embodiment of this application.

FIG. 13 is a schematic block diagram of a screen projection exception processing apparatus 800 according to an embodiment of this application. The apparatus 800 may be configured to perform actions performed by the screen projection source device in the foregoing method embodiments. The apparatus 800 includes a screen projection unit 810 and a processing unit 820.

The screen projection unit 810 is configured to implement performing screen projection to a screen projection target device by a screen projection source device through a screen projection application, the screen projection application being an application installed in the screen projection source device and configured to trigger screen projection between devices;

the processing unit 820 is configured to re-enable the screen projection application in a case that the screen projection application is closed abnormally; and the processing unit 820 is further configured to set a state of a virtual display driver to a disabled state in a case that it is detected that the virtual display driver is in an enabled state, the virtual display driver being a drive program in the screen projection source device that is configured to implement a screen projection function, the drive program being software corresponding to hardware, and configured to drive a graphics card. This drive program is a small piece of code added to the operating system, and includes information about a hardware device.

By using the solution of this application, when the screen projection source device performs screen projection to the screen projection target device through the screen projection application, if the screen projection application is closed abnormally, the state of the virtual display driver is set to the disabled state after the screen projection application is re-enabled. In this way, the virtual display driver will no longer create a virtual display, so that the screen projection source device cannot capture an image used for screen projection in a case that no virtual display exists. Therefore, in a non-screen projection scenario after the screen projection application is restarted, when a user selects an "Only the second screen for display" option in the local screen projection function of the screen projection source device, a display screen of the screen projection source device performs display normally without a black screen phenomenon.

In a possible implementation, the apparatus 800 further includes a receiving unit. The receiving unit is configured to: after the processing unit 820 sets the state of the virtual display driver to the disabled state through the screen projection application, receive a first input by a user, the first input being only used for triggering screen display of the screen projection target device. In this case, the processing unit 820 skips responding to the first input.

In a possible implementation, the processing unit 820 is further configured to:
disconnect a screen projection connection between the screen projection source device and the screen projection target device in a case that the screen projection application is closed abnormally.

In a possible implementation, the processing unit 820 is further configured for that: after the screen projection source device sets the state of the virtual display driver to the disabled state through the screen projection application, in a case that the virtual display driver is in the disabled state, the screen projection source device prohibits the virtual display driver from creating a virtual display.

An image displayed by the virtual display is used for being displayed by the screen projection target device during screen projection.

In a possible implementation, the processing unit 820 is further configured to:
delete a display parameter in a registration table in a case that the screen projection application detects that there is the display parameter in the registration table in the screen projection source device.

In a possible implementation, the processing unit 820 is configured to re-enable the screen projection application in a case that the screen projection application is closed abnormally, which includes:
the screen projection application being closed abnormally in a case that the screen projection source device is shut down abnormally; and
restarting and enabling, by the processing unit 820, the screen projection application in response to a second input by the user.

In a possible implementation, the screen projection unit 810 is further configured to establish a screen projection connection with the screen projection target device through the screen projection application.

In a possible implementation, the screen projection unit 810 may include the screen projection application, the registration table, the virtual display driver, and the virtual display; and the screen projection unit 810 is specifically configured to:

acquire the display parameter of the screen projection target device through the screen projection connection;

write the display parameter of the screen projection target device into the registration table of a preset path through the screen projection application;

set the virtual display driver to the enabled state through the screen projection application;

read the display parameter of the screen projection target device from the registration table of the preset path through the virtual display driver;

create the virtual display according to the display parameter of the screen projection target device through the virtual display driver, the display parameter of the virtual display being consistent with the display parameter of the screen projection target device;

acquire, by the screen projection application, an image displayed by the virtual display; and send, by the screen projection application, the image displayed by the virtual display to the screen projection target device through the screen projection connection.

In a possible implementation, the screen projection unit 810 is further configured to establish a screen projection connection with the screen projection target device through the screen projection application, which specifically includes:

receiving, by the screen projection unit 810, a third input by the user on an application icon of the screen projection application, the third input being used for triggering the screen projection source device to establish the screen projection connection with the screen projection target device;

in response to the third input, finding, by the screen projection unit 810, the screen projection target device, and displaying an identifier of the screen projection target device;

receiving, by the screen projection unit 810, a fourth input by the user, the fourth input being used for selecting the identifier of the screen projection target device; and triggering, by the screen projection unit 810 in response to the fourth input, the screen projection source device to establish the screen projection connection with the screen projection target device.

In a possible implementation, the display parameter of the screen projection target device includes a display size, resolution, or a refresh rate of a display screen.

The apparatus 800 according to the embodiments of this application may correspond to the methods described in the embodiments of this application, and the foregoing and other operations and/or functions of the units in the apparatus 800 are respectively for implementing corresponding procedures in the methods. For brevity, details are not described herein again.

Figure 14:
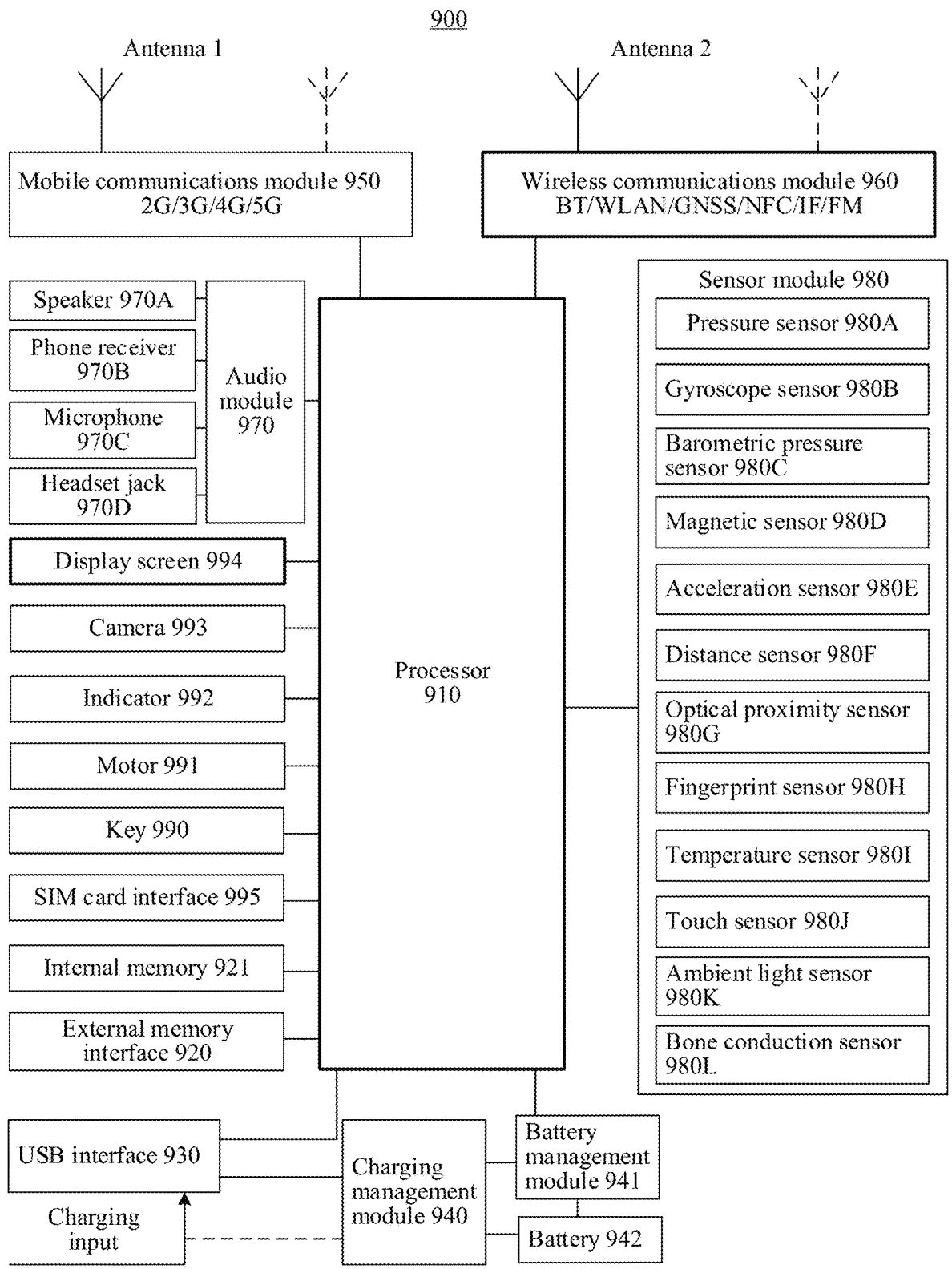
FIG. 14 is a schematic structural diagram of an electronic device according to an embodiment of this application.

FIG. 14 is a schematic structural diagram of an electronic device 900 according to an embodiment of this application. The electronic device 900 may include a processor 910, an external memory interface 920, an internal memory 921, a universal serial bus (universal serial bus, USB) interface 930, a charging management module 940, a power management unit 941, a battery 942, an antenna 1, an antenna 2, a mobile communications module 950, a wireless communications module 960, and an audio module 970, a speaker 970A, a phone receiver 970B, a microphone 970C, a headset jack 970D, a sensor module 980, a key 990, a motor 991, an indicator 992, a camera 993, a display screen 994, a subscriber identity module (subscriber identity module, SIM) card interface 995, and the like. The sensor module 980 may include a pressure sensor 980A, a gyroscope sensor 980B, a barometric pressure sensor 980C, a magnetic sensor 980D, an acceleration sensor 980E, a distance sensor 980F, an optical proximity sensor 980G, a fingerprint sensor 980H, a temperature sensor 980J, a touch sensor 980K, an ambient light sensor 980L, a bone conduction sensor 980L, and the like.

It may be understood that the schematic structure in this embodiment of this application constitutes no specific limitation on the electronic device 900. In some other embodiments of this application, the electronic device 900 may include more or fewer components than those shown in the figure, or some components may be combined, or some components may be divided, or different component arrangements may be used. The components in the portrait may be implemented by hardware, software, or a combination of software and hardware.

The processor 910 may include one or more processing units. For example, the processor 910 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors. The controller may be a nerve center and a command center of the electronic device 900. The controller may generate an operation control signal according to instruction operation code and a time-sequence signal, and control obtaining and executing of instructions.

A memory may also be disposed in the processor 910, configured to store instructions and data. In some embodiments, the memory in processor 910 is a cache memory. The memory may store an instruction or data that has just been used or cyclically used by the processor 910. If the processor 910 needs to use the instruction or the data again, the processor may directly invoke the instruction or the data from the memory, to avoid repeated access and reduce a waiting time of the processor 910, thereby improving system efficiency.

In some embodiments, the processor 910 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that a schematic interface connection relationship between the modules in this embodiment of this application is merely an example for description, and constitutes no limitation on the structure of the electronic device 900. In some other embodiments of this application, the electronic device 900 may alternatively use an interface connection manner different from that in the foregoing embodiment, or use a combination of a plurality of interface connection manners.

The charging management module 940 is configured to receive charging input from the charger. The charger may be a wireless charger, or may be a wired charger. In some embodiments of wired charging, the charging management module 940 may receive a charging input of a wired charger by using the USB interface 930. In some embodiments of wireless charging, the charging management module 940 may receive wireless charging input by using a wireless charging coil of the electronic device 900. The charging management module 940 may further supply power to the electronic device by using the power management unit 941 while charging the battery 942.

The power management unit 941 is configured to be connected to the battery 942, the charging management module 940, and the processor 910. The power management unit 941 receives an input of the battery 942 and/or the charging management module 940, to supply power to the processor 910, the internal memory 921, an external memory, a display screen 994, the camera 993, the wireless communications module 960, and the like. The power management unit 941 may be further configured to monitor parameters such as a battery capacity, a cycle count of a battery, and a battery health state (leakage and impedance). In some other embodiments, the power management unit 941 may alternatively be disposed in the processor 910. In some other embodiments, the power management unit 941 and the charging management module 940 may alternatively be disposed in a same device.

A wireless communication function of the electronic device 900 may be implemented by using the antenna 1, the antenna 2, the mobile communications module 950, the wireless communications module 960, the modem processor, the baseband processor, and the like.

The antenna 1 and the antenna 2 are configured to transmit and receive electromagnetic wave signals. Each antenna of the electronic device 900 may be configured to cover one or more communication frequency bands. Different antennas may be multiplexed to improve antenna utilization. For example, the antenna 1 may be multiplexed into a diversity antenna of a wireless local area network. In some other embodiments, the antennas may be used with a tuning switch.

The mobile communications module 950 may provide a solution to wireless communication such as 2G/3G/4G/5G applied to the electronic device 900. The mobile communications module 950 may include at least one filter, a switch, a power amplifier, a low noise amplifier (low noise amplifier, LNA), and the like. The mobile communications module 950 may receive an electromagnetic wave by using the antenna 1, perform processing such as filtering and amplification on the received electromagnetic wave, and send the electromagnetic wave to the modem processor for demodulation. The mobile communications module 950 may further amplify a signal modulated by the modem processor, and convert the signal into an electromagnetic wave for radiation through the antenna 1. In some embodiments, at least some of functional modules of the mobile communications module 950 may be disposed in the processor 910. In some embodiments, at least some of the functional modules of the mobile communications module 950 may be disposed in a same device as at least some of modules of the processor 910.

The modem processor may include a modulator and a demodulator. The modulator is configured to modulate a to-be-sent low-frequency baseband signal into a middle/high-frequency signal. The demodulator is configured to demodulate the received electromagnetic wave signal into a low frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal by using an audio device (not limited to the speaker 970A, the phone receiver 970B, or the like), or displays an image or a video by using the display screen 994. In some embodiments, the modem processor may be an independent component. In some other embodiments, the modem processor may be independent of the processor 910, and is disposed in a same device as the mobile communications module 950 or another functional module.

The wireless communications module 960 may provide a solution to wireless communication applied to the electronic device 900, such as WLAN (for example, a Wi-Fi), BT, a global navigation satellite system (global navigation satellite system, GNSS), FM, NFC, IR, or a general 2.4G/5G wireless communication technology. The wireless communications module 960 may be one or more devices that integrate at least one communications processing module. The wireless communications module 960 receives an electromagnetic wave by using the antenna 2, performs frequency modulation on and filters the electromagnetic wave signal, and sends a processed signal to the processor 910. The wireless communications module 960 may further receive a to-be-sent signal from the processor 910, perform frequency modulation on and amplify the to-be-sent signal, and convert the to-be-sent signal into an electromagnetic wave by using the antenna 2 for radiation.

In some embodiments, the wireless communications module 960 may be a Wi-Fi and/or Bluetooth chip. The electronic device 900 may establish a connection with chips of electronic devices such as a wireless headset through the chip, to implement wireless communication and service processing between the electronic device 900 and other electronic devices through the connection. The Bluetooth chip can usually support BR/EDR Bluetooth and BLE.

In some embodiments, the antenna 1 and the mobile communications module 950 of the electronic device 900 are coupled, and the antenna 2 and the wireless communications module 960 of the electronic device 900 are coupled, so that the electronic device 900 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TDSCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 900 implements a display function by using the GPU, the display screen 994, the application processor, and the like. The GPU is a microprocessor for image processing, and is connected to the display screen 994 and the application processor. The GPU is configured to perform mathematical and geometric calculation, and is configured to render an image. The processor 910 may include one or more GPUs that execute a program instruction to generate or change display information.

The display screen 994 is configured to display an image, a video, and the like. The display screen 994 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device 900 may include 1 or N display screens 994. N is a positive integer greater than 1.

The electronic device 900 may implement a photographing function by using the ISP, the camera 993, the video codec, the GPU, the display screen 994, the application processor, and the like.

The ISP is configured to process data fed back by the camera 993. For example, during photographing, a shutter is opened, light is transferred to a camera photosensitive element by using a lens, an optical signal is converted into an electrical signal, and the camera photosensitive element transfers the electrical signal to the ISP for processing, to convert the electrical signal into an image visible to a naked eye. The ISP may alternatively perform algorithm optimization on noise, luminance, and complexion of the image. The ISP may alternatively optimize parameters such as exposure and a color temperature of a photographing scenario. In some embodiments, the ISP may be disposed in the camera 993.

The camera 993 is configured to capture a static image or a video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in an RGB format, a YUV format, or the like. In some embodiments, the electronic device 900 may include 1 or N cameras 993, and N is a positive integer greater than 1.

The digital signal processor is configured to process a digital signal, and in addition a digital image signal, the digital signal processor may also process other digital signals. For example, when the electronic device 900 performs frequency selection, the digital signal processor is configured to perform Fourier transform and the like on frequency energy.

The video codec is configured to compress or decompress a digital video. The electronic device 900 may support one or more video codecs. In this way, the electronic device 900 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 900, for example, image recognition, facial recognition, voice recognition, and text understanding.

The external memory interface 920 may be configured to connect to an external storage card such as a micro SD card, to expand a storage capability of the electronic device 900. The external storage card communicates with the processor 910 by using the external memory interface 920, to implement a data storage function. For example, a file such as a music or a video is stored in the external storage card.

The internal memory 921 may be configured to store computer executable program code, where the executable program code includes an instruction. The processor 910 runs the instruction stored in the internal memory 921, to perform various function applications and data processing of the electronic device 900. The internal memory 921 may include a program storage area and a data storage area. The program storage area may store an operating system, an application required by at least one function (such as a voice playing function and an image playing function), and the like. The data storage area may store data (for example, audio data and an address book) and the like created when the electronic device 900 is used. In addition, the internal memory 921 may include a high-speed random access memory, and may also include a non-volatile memory, for example, at least one magnetic disk storage device, a flash memory device, or a universal flash storage (universal flash storage, UFS).

The processor 910 may be configured to execute the foregoing program code, and invoke related modules to implement functions of the electronic device in the embodiments of this application, for example, establishing a plurality of communication links with another electronic device, and transmitting data of a preset service to the another electronic device through the plurality of communication links when there is the preset service (for example, a file transmission service).

The electronic device 900 may implement an audio function by using the speaker 970A, the phone receiver 970B, the microphone 970C, the headset jack 970D, the application processor, and the like in the audio module 970. The audio function is, for example, music playback and sound recording.

The audio module 970 is configured to convert digital audio information into analog audio signal output, and is also configured to convert analog audio input into a digital audio signal. The audio module 970 may further be configured to encode and decode audio signals. In some embodiments, the audio module 970 may be disposed in the processor 910, or some functional modules in the audio module 970 are disposed in the processor 910.

The speaker 970A, also referred to as a "speaker", is configured to convert an audio electrical signal into a sound signal. Music may be listened to or a hands-free call may be answered by using the speaker 970A in the electronic device 900.

The phone receiver 970B, also referred to as a "handset", is configured to convert an audio electrical signal into a sound signal. When the electronic device 900 is configured to answer a call or receive voice information, the phone receiver 970B may be put close to a human ear to receive a voice.

The microphone 970C, also referred to as a "microphone", is configured to convert a sound signal into an electrical signal. When making a call or sending voice information, a user may make a sound near the microphone 970C through the mouth of the user, to input a sound signal into the microphone 970C. At least one microphone 970C may be disposed in the electronic device 900. In some other embodiments, two microphones 970C may be disposed in the electronic device 900, to collect a sound signal and implement a noise reduction function. In some other embodiments, three, four, or more microphones 970C may be alternatively disposed in the electronic device 900, to collect a sound signal, implement noise reduction, recognize a sound source, implement a directional recording function, and the like.

The headset jack 970D is configured to be connected to a wired headset. The headset jack 970D may be a USB interface 930, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 980A is configured to sense a pressure signal, and can convert the pressure signal into an electrical signal. In some embodiments, the pressure sensor 980A may be disposed on the display screen 994. There are many types of pressure sensors 980A, such as a resistive pressure sensor, an inductive pressure sensor, and a capacitive pressure sensor. The capacitive pressure sensor may be a parallel plate including at least two conductive materials. When a force is applied to the pressure sensor 980A, capacitance between electrodes changes. The electronic device 900 determines pressure strength based on a change in the capacitance. When a touch operation is performed on the display screen 994, the electronic device 900 detects strength of the touch operation by using the pressure sensor 980A. The electronic device 900 may further calculate a position of the touch based on a detection signal of the pressure sensor 980A. In some embodiments, touch operations that are applied to a same touch position but have different touch operation intensity may correspond to different operation instructions. For example, when a touch operation whose touch operation strength is less than a first pressure threshold is performed on a short message application icon, an instruction of checking a short message is executed. When a touch operation whose touch operation strength is greater than or equal to the first pressure threshold is performed on the short message application icon, an instruction of creating a new short message is executed.

The gyroscope sensor 980B may be configured to determine a motion posture of the electronic device 900. In some embodiments, an angular velocity of the electronic device 900 around three axes (i.e., x, y, and z axes) may be determined through the gyroscope sensor 980B. The gyroscope sensor 980B may be used for image stabilization in photography. For example, when the shutter is pressed, the gyroscope sensor 980B detects an angle at which the electronic device 900 jitters, and calculates, based on the angle, a distance for which a lens module needs to compensate, and allows the lens to cancel the jitter of the electronic device 900 through reverse motion, thereby implementing image stabilization. The gyroscope sensor 980B may also be used for navigation and a motion sensing game scene.

The acceleration sensor 980E may detect an acceleration value of the electronic device 900 all directions (generally in three axes). When the electronic device 900 is stationary, a magnitude and a direction of a gravity may be detected. The acceleration sensor 980E may be further configured to recognize a posture of the electronic device, and is applied to an application such as switching between landscape orientation and portrait orientation or a pedometer.

The distance sensor 980F is configured to measure a distance. The electronic device 900 may measure a distance by infrared light or laser. In some embodiments, in a photographing scenario, the electronic device 900 may measure a distance by using the distance sensor 980F, to implement quick focusing.

The optical proximity sensor 980G may include, for example, a light-emitting diode (light-emitting diode, LED) and an optical detector such as a photodiode. The light-emitting diode may be an infrared light emitting diode. The electronic device 900 emits infrared light by using the light emitting diode. The electronic device 900 detects infrared reflected light from a nearby object by using the photodiode. When sufficient reflected light is detected, it may be determined that there is an object near the electronic device 900. When detecting insufficient reflected light, the electronic device 900 may determine that there is no object near the electronic device 900. The electronic device 900 may detect, by using the optical proximity sensor 980G, that a user holds the electronic device 900 close to an ear for a call, so that automatic screen-off is implemented to achieve power saving. The optical proximity sensor 980G may also be used in a smart cover mode or a pocket mode to automatically unlock or lock the screen.

The ambient light sensor 980K is configured to perceive ambient light brightness. The electronic device 900 may adaptively adjust a luminance of the display screen 994 according to the perceived ambient light brightness. The ambient light sensor 980K may also be configured to automatically adjust white balance during photographing. The ambient light sensor 980K may further cooperate with the optical proximity sensor 980G to detect whether the electronic device 900 is in a pocket, so as to prevent an accidental touch.

The barometric pressure sensor 980C is configured to measure barometric pressure. In some embodiments, the electronic device 900 calculates an altitude by using a barometric pressure value measured by the barometric pressure sensor 980C, to assist in positioning and navigation.

The magnetic sensor 980D includes a Hall sensor. The electronic device 900 may detect a displacement of the electronic device 900 by using the magnetic sensor 980D. In some embodiments, the Hall sensor may use a magnet to form a linear trapezoidal magnetic field (or may be referred to as a slope magnetic field). A displacement change of a Hall plate in the linear magnetic field is consistent with a strength change of the magnetic field, and the formed Hall potential is in direct proportion to the displacement. The electronic device 900 can measure the displacement by acquiring the Hall potential.

The fingerprint sensor 980H is configured to collect a fingerprint. The electronic device 900 may implement fingerprint unlock, application lock accessing, fingerprint photographing, fingerprint-based call answering, and the like by using a feature of the acquired fingerprint.

The temperature sensor 980I is configured to detect a temperature. In some embodiments, the electronic device 900 executes a temperature processing policy by using the temperature detected by the temperature sensor 980I. For example, when the temperature reported by the temperature sensor 980I exceeds a threshold, the electronic device 900 reduces performance of a processor near the temperature sensor 980I, to reduce power consumption and implement heat protection. In some other embodiments, when the temperature is lower than another threshold, the electronic device 900 heats the battery 942, to avoid an abnormal shutdown of the electronic device 900 caused by a low temperature. In some other embodiments, when the temperature is lower than still another threshold, the electronic device 900 boosts an output voltage of the battery 942 to prevent abnormal shutdown caused by low temperature.

The touch sensor 980J is also referred to as a "touch panel". The touch sensor 980J may be disposed on the display screen 994. The touch sensor 980J and the display screen 994 form a touchscreen, which is also referred to as a "touchscreen". The touch sensor 980J is configured to detect a touch operation on or near the touch sensor 980J. The touch sensor may transfer the detected touch operation to the application processor to determine a type of the touch event. Visual output related to the touch operation may be provided by using the display screen 994. In some other embodiments, the touch sensor 980J may alternatively be disposed on a surface of the electronic device 900, and is located on a position different from that of the display screen 994.

The bone conduction sensor 980L may collect a vibration signal. In some embodiments, the bone conduction sensor 980L may obtain a vibration signal of a vibration bone of a human vocal-cord part. The bone conduction sensor 980L may also contact a body pulse to receive a blood pressure beating signal. In some embodiments, the bone conduction sensor 980L may also be disposed in the headset, to combine into a bone conduction headset. The audio module 970 may parse out a voice signal based on the vibration signal of the vibration bone of the vocal-cord part that is obtained by the bone conduction sensor 980L, to implement a voice function. The application processor may parse heart rate information based on the blood pressure beating signal obtained by the bone conduction sensor 980L, to implement a heart rate detection function.

The key 990 includes a power-on key, a volume key, or the like. The key 990 may be a mechanical key, or a touch-type key. The electronic device 900 may receive a key input, and generate a key signal input related to user setting and function control of the electronic device 900.

The motor 991 may generate a vibration prompt. The motor 991 may be used for an incoming call vibration prompt and a touch vibration feedback. For example, touch operations performed on different applications (for example, photo taking and audio playing) may correspond to different vibration feedback effects. The motor 991 may also correspond to different vibration feedback effects for touch operations applied to different areas of the display screen 994. Different application scenarios (for example, a time prompt, information receiving, an alarm clock, and a game) may also correspond to different vibration feedback effects. The touch vibration feedback effect may also support customization.

The indicator 992 may be an indicator light that may be configured to indicate a charging state and a power change, or may be configured to indicate a message, a missed call, a notification, and the like.

The SIM card interface 995 is configured to connect to a SIM card. The SIM card may be inserted into the SIM card interface 995 or plugged from the SIM card interface 995, to come into contact with or be separated from the electronic device 900. The electronic device 900 may support one or N SIM card interfaces. N is a positive integer greater than 1. The SIM card interface 995 may support a nano-SIM card, a micro-SIM card, a SIM card, and the like. A plurality of cards may be inserted into a same SIM card interface 995 at the same time. The plurality of cards may be of a same type or different types. The SIM card interface 995 may be compatible with different types of SIM cards. The SIM card interface 995 may also be compatible with an external storage card. The electronic device 900 interacts with a network by using a SIM card, to implement functions such as a call and data communication. In some embodiments, the electronic device 900 uses an eSIM, that is, an embedded SIM card. The eSIM card may be embedded in the electronic device 900 and cannot be separated from the electronic device 900.

The electronic device 900 may be a mobile terminal, or may be a non-mobile terminal. For example, the electronic device 900 may be a mobile phone, a tablet computer, a notebook computer, a palmtop computer, an in-vehicle terminal, a wearable device, an ultra-mobile personal computer (ultra-mobile personal computer, UMPC), a netbook, a personal digital assistant (personal digital assistant, PDA), a wireless headset, a wireless bracelet, wireless smart glasses, a wireless watch, an augmented reality (augmented reality, AR)/virtual reality (virtual reality, VR) device, a desktop computer, or a smart home appliance (such as a TV, a speaker, a refrigerator, an air purifier, an air conditioner, or a rice cooker). The electronic device 900 may also be collectively referred to as an Internet of Things (Internet of Things, IoT) device. The device type of the electronic device 900 is not specifically limited in the embodiments of this application.

It is to be understood that the electronic device 900 shown in FIG. 14 may correspond to the apparatus 800 shown in FIG. 13. The processor 910 and the wireless communications module 960 in the electronic device 900 shown in FIG. 14 may respectively correspond to the processing unit 820 and the screen projection unit 810 in the apparatus 800 shown in FIG. 13.

During actual implementation, when the electronic device 900 is running, the processor 910 executes computer-executable instructions in the memory 921 to perform the operation steps of the foregoing methods by using the electronic device 900.

Optionally, in some embodiments, this application provides a chip, coupled to a memory and configured to read and execute a computer program or instructions stored in the memory, to perform the method in the foregoing embodiments.

Optionally, in some embodiments, this application provides an electronic device. The electronic device includes a chip, the chip being configured to read and execute a computer program or instructions stored in a memory, to cause the method in the embodiments to be performed.

Optionally, in some embodiments, the embodiments of this application further provide a computer-readable storage medium. The computer-readable storage medium stores program code, the computer program code, when run on a computer, causing the computer to perform the method in the foregoing embodiments.

Optionally, in some embodiments, the embodiments of this application further provide a computer program product, including computer program code, the computer program code, when run on a computer, causing the computer to perform the method according to the foregoing embodiments.

In the embodiments of this application, the electronic device includes a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). The operating system of the operating system layer may be any one or more computer operating systems such as a Linux operating system, a Unix operating system, an Android operating system, an iOS operating system, or a Windows operating system that implement service processing by using a process (process). The application layer may include an application such as a browser, an address book, word processing software, or instant messaging software.

The embodiments of this application do not specifically limit a specific structure of an execution entity of the methods provided in the embodiments of this application, as long as the program in which the code of the methods provided in the embodiments of this application is recorded can be executed for communication according to the methods provided in the embodiments of this application. For example, the execution entity of the methods provided in the embodiments of this application may be an electronic device, or a functional module in the electronic device that can call a program and execute the program.

Aspects or features of this application may be implemented as a method, an apparatus or a product that uses standard programming and/or engineering technologies. The term "product" used in this application may cover a computer program that can be accessed from any computer readable component, carrier or medium. For example, the computer-readable medium may include but is not limited to: a magnetic storage component (such as a hard disk, a floppy disk, or a magnetic tape), an optical disc (for example, a compact disc (compact disc, CD), or a digital versatile disc (digital versatile disc, DVD)), a smart card, and a flash memory component (such as an erasable programmable read-only memory (erasable programmable read-only memory, EPROM), a card, a stick, or a key drive).

Various storage media described in this specification may indicate one or more devices and/or other machine-readable media that is used to store information. The term "machine readable media" may include but is not limited to a radio channel, and various other media that can store, contain and/or carry an instruction and/or data.

It should be understood that, in this embodiment of this application, the mentioned processor may be a central processing unit (central processing unit, CPU), or the processor may be another general purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or a transistor logic device, a discrete hardware component, or the like. The general-purpose processor may be a microprocessor, or the processor may be any conventional processor and the like.

It should be further understood that the memory in the embodiments of this application may be a volatile memory or a nonvolatile memory, or may include a volatile memory and a nonvolatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM). For example, the RAM may be used as an external cache. As an example but not a limit, RAM may include the following various forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It is to be noted that, when the processor is a general-purpose processor, a DSP, an ASIC, an FPGA, or another programmable logic device, a discrete gate or a transistor logic device, or a discrete hardware component, the memory (a storage module) may be integrated into the processor.

It should be further noted that, the memory described herein aims to include but not limited to these memories and any other suitable types of memories.

A person of ordinary skill in the art may notice that the exemplary units and steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the protection scope of this application.

A person skilled in the art may clearly understand that, for simple and clear description, for specific work processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one unit, or each of the units may exist alone physically, or two or more units may be integrated into one unit.

When the functions are implemented in the form of a software functional unit and sold or used as an independent product, the functions may be stored in a computer readable storage medium. Based on such an understanding, the technical solutions of this application essentially, or the part contributing to the related art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of this application. The storage medium may include but is not limited to: various media that may store processing code, such as a USB flash drive, a removable hard disk, a ROM, a RAM, a magnetic disk, and an optical disc.

Unless otherwise defined, meanings of all technical and scientific terms used in this specification are the same as those usually understood by a person skilled in the art to which this application belongs. Herein, terms used in the specification of this application are merely intended to describe objectives of specific embodiments, but are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A screen projection processing method, comprising:
performing, by a screen projection source device, screen projection to a screen projection target device through a screen projection application, wherein the screen projection source device is off based on a power failure after performing the screen projection;
after the screen projection source device is off, starting, by the screen projection source device, in response to a first input by a user;
enabling, by the screen projection source device, the screen projection application;
setting, by the screen projection source device, a state of a virtual display driver to a disabled state;
establishing, by the screen projection source device, a first screen projection connection with the screen projection target device through the screen projection application; and
setting, by the screen projection source device, the state of the virtual display driver to an enabled state.

2. The method according to claim 1, wherein after the enabling, by the screen projection source device, the screen projection application, the method further comprises:
detecting, by the screen projection source device, that a display parameter is in a registration table in the screen projection source device, the registration table being a storage area for storing the display parameter of the screen projection target device; and
deleting, by the screen projection source device, the display parameter in the registration table.

3. The method according to claim 2, wherein
the detecting, by the screen projection source device, that the display parameter is in the registration table in the screen projection source device comprises: invoking, by the screen projection source device, the Windows interface through the screen projection application to detect that the display parameter is in the registration table in the screen projection source device; and
the deleting, by the screen projection source device, the display parameter in the registration table comprises: invoking, by the screen projection source device, the Windows interface through the screen projection application to delete the display parameter in the registration table.

4. The method according to claim 2, wherein the display parameter of the screen projection target device comprises at least one of the following: a display size, resolution, or a refresh rate of a display screen.

5. The method according to claim 1, wherein the virtual display driver is prohibited from creating a virtual display, by the screen projection source device when the virtual display driver is in the disabled state,
an image displayed by the virtual display being used for being displayed by the screen projection target device during screen projection.

6. The method according to claim 1, wherein after the setting, by the screen projection source device, the state of the virtual display driver to the disabled state, the method further comprises:
receiving, by the screen projection source device, a second input by a user, the second input being only used for triggering screen display of the screen projection target device; and
skipping, by the screen projection source device, responding to the second input.

7. The method according to claim 1, wherein the enabling, by the screen projection source device, the screen projection application comprises:
automatically enabling, by the screen projection source device, the screen projection application after the screen projection source device is started; or
enabling, by the screen projection source device, the screen projection application in response to a user triggering operation in after the screen projection source device is started.

8. The method according to claim 1, wherein the screen projection application, a Windows interface corresponding to the screen projection application, and the virtual display driver are installed on the screen projection source device, and the screen projection source device is provided with a registration table; and
the performing, by the screen projection source device, screen projection to the screen projection target device through the screen projection application comprises:
establishing, by the screen projection source device, a second screen projection connection with the screen projection target device through the screen projection application;
acquiring, by the screen projection source device, a display parameter of the screen projection target device through the second screen projection connection;
writing, by the screen projection source device, the display parameter of the screen projection target device into the registration table of a preset path through the screen projection application;
invoking, by the screen projection source device, the Windows interface through the screen projection application to set the virtual display driver to the enabled state, the Windows interface being an application programming interface corresponding to the screen projection application and installed on the screen projection source device;

reading, by the screen projection source device, the display parameter of the screen projection target device from the registration table through the virtual display driver;

creating, by the screen projection source device, a virtual display according to the display parameter of the screen projection target device through the virtual display driver;

feeding, by the virtual display driver, successful creation of the virtual display back to the screen projection application through the Windows interface;

acquiring, by the screen projection source device through the screen projection application, an image displayed by the virtual display as a screen projection image, the image displayed by the virtual display being an image displayed in the screen projection source device; and sending, by the screen projection source device, the screen projection image to the screen projection target device through the screen projection application.

9. The method according to claim 8, wherein the setting, by the screen projection source device, the state of the virtual display driver to the disabled state comprises: invoking, by the screen projection source device, the Windows interface through the screen projection application to set the state of the virtual display driver to the disabled state.

10. The method according to claim 8, wherein the establishing, by the screen projection source device, the second screen projection connection with the screen projection target device through the screen projection application comprises:

receiving, by the screen projection source device, a third input by a user on an application icon of the screen projection application, the third input being used for triggering the screen projection source device to establish the second screen projection connection with the screen projection target device;

in response to the third input, finding, by the screen projection source device, the screen projection target device, and displaying an identifier of the screen projection target device;

receiving, by the screen projection source device, a fourth input by the user, the fourth input being used for selecting the identifier of the screen projection target device; and establishing, by the screen projection source device, the second screen projection connection with the screen projection target device in response to the fourth input.

11. An electronic device, comprising a processor, the processor being coupled to a memory and configured to execute a computer program or instructions stored in the memory, to cause the electronic device to perform a method, the method comprising:

performing screen projection to a screen projection target device through a screen projection application, wherein the electronic device is off based on a power failure after performing the screen projection;

after the electronic device is off, starting in response to a first input by a user;

enabling the screen projection application;

setting a state of a virtual display driver to a disabled state;

establishing a first screen projection connection with the screen projection target device through the screen projection application; and setting the state of the virtual display driver to an enabled state.

12. The electronic device according to claim 11, wherein after the enabling the screen projection application, the method further comprises:

detecting that a display parameter is in a registration table in the electronic device, the registration table being a storage area for storing the display parameter of the screen projection target device; and deleting the display parameter in the registration table.

13. The electronic device according to claim 11, wherein the virtual display driver is prohibited from creating a virtual display when the virtual display driver is in the disabled state, an image displayed by the virtual display being used for being displayed by the screen projection target device during screen projection.

14. The electronic device according to claim 11, wherein after the setting the state of the virtual display driver to the disabled state, the method further comprises:

receiving a second input by a user, the second input being only used for triggering screen display of the screen projection target device; and skipping responding to the second input.

15. The electronic device according to claim 11, wherein the enabling the screen projection application comprises:

automatically enabling the screen projection application after the electronic device is started; or enabling the screen projection application in response to a user triggering operation after the electronic device is started.

16. A chip system, coupled to a memory and configured to read and execute a computer program stored in the memory, to perform a method, the method comprising:

performing screen projection to a screen projection target device through a screen projection application, wherein the chip system is off based on a power failure after performing the screen projection;

after the chip system is off, starting in response to a first input by a user;

enabling the screen projection application;

setting a state of a virtual display driver to a disabled state;

establishing a first screen projection connection with the screen projection target device through the screen projection application; and setting the state of the virtual display driver to an enabled state.

* * * * *